US009500497B2

(12) United States Patent
Lavoie et al.

(10) Patent No.: US 9,500,497 B2
(45) Date of Patent: Nov. 22, 2016

(54) SYSTEM AND METHOD OF INPUTTING AN INTENDED BACKING PATH

(71) Applicant: Ford Global Technologies, LLC, Dearborn, MI (US)

(72) Inventors: Erick Michael Lavoie, Dearborn, MI (US);
(Continued)

(73) Assignee: Ford Global Technologies, LLC, Dearborn, MI (US)

( * ) Notice: Subject to any disclaimer, the term of this patent is extended or adjusted under 35 U.S.C. 154(b) by 122 days.

(21) Appl. No.: 14/460,003

(22) Filed: Aug. 14, 2014

(65) Prior Publication Data
US 2014/0358424 A1 Dec. 4, 2014

Related U.S. Application Data

(63) Continuation-in-part of application No. 14/289,888, filed on May 29, 2014, which is a continuation-in-part
(Continued)

(51) Int. Cl.
*G01C 21/36* (2006.01)
*G01C 21/32* (2006.01)
(Continued)

(52) U.S. Cl.
CPC ........... *G01C 21/3676* (2013.01); *B60D 1/245* (2013.01); *B60D 1/62* (2013.01); *B60R 1/00* (2013.01);
(Continued)

(58) Field of Classification Search
CPC ............ G01C 21/3614; G01C 21/3617; G01C 21/00; G01C 21/34; G01C 21/3461;
(Continued)

(56) References Cited

U.S. PATENT DOCUMENTS 3,605,088 A 9/1971 Savelli
3,833,928 A 9/1974 Gavit et al.
(Continued)

FOREIGN PATENT DOCUMENTS

CN 101610420 A 12/2009
CN 101833869 A 9/2010
(Continued)

OTHER PUBLICATIONS

Nüsser, René; Pelz, Rodolfo Mann, "Bluetooth-based Wireless Connectivity in an Automotive Environment", VTC, 2000, pp. 1935-1942.
(Continued)

*Primary Examiner* — Thomas G Black
*Assistant Examiner* — Sze-Hon Kong
(74) *Attorney, Agent, or Firm* — Raymond Coppiellie; Price Heneveld LLP

(57) ABSTRACT

A path input system is provided. The path input system includes at least one imaging device for generating image data. A GPS device is included for generating satellite image data. A controller generates an aerial view of a vehicle and a trailer based on the image data and the satellite data. A display is included for displaying the aerial view and registering a touch event thereon that inputs an intended path for the vehicle and the trailer.

18 Claims, 11 Drawing Sheets

(72) Inventors: John Shutko, Ann Arbor, MI (US);
Roger Arnold Trombley, Ann Arbor, MI (US)

Related U.S. Application Data of application No. 14/256,427, filed on Apr. 18, 2014, which is a continuation-in-part of application No. 14/249,781, filed on Apr. 10, 2014, now Pat. No. 9,374,562, which is a continuation-in-part of application No. 14/188,213, filed on Feb. 24, 2014, which is a continuation-in-part of application No. 13/847,508, filed on Mar. 20, 2013, and a continuation-in-part of application No. 14/068,387, filed on Oct. 31, 2013, now Pat. No. 9,102,271, which is a continuation-in-part of application No. 14/059,835, filed on Oct. 22, 2013, now Pat. No. 9,248,858, which is a continuation-in-part of application No. 13/443,743, filed on Apr. 10, 2012, now Pat. No. 8,825,328, which is a continuation-in-part of application No. 13/336,060, filed on Dec. 23, 2011, now Pat. No. 8,909,426, said application No. 14/249,781 is a continuation-in-part of application No. 14/161,832, filed on Jan. 23, 2014, now Pat. No. 9,346,396, which is a continuation-in-part of application No. 14/059,835, filed on Oct. 22, 2013, now Pat. No. 9,248,858, said application No. 14/249,781 is a continuation-in-part of application No. 14/201,130, filed on Mar. 7, 2014, now Pat. No. 9,290,202, which is a continuation-in-part of application No. 14/068,387, filed on Oct. 31, 2013, now Pat. No. 9,102,271.

(60) Provisional application No. 61/477,132, filed on Apr. 19, 2011.

(51) Int. Cl.

| | | |
|---|---|---|
| *B62D 15/02* | (2006.01) | |
| *G08G 1/16* | (2006.01) | |
| *B62D 13/06* | (2006.01) | |
| *B60W 30/00* | (2006.01) | |
| *H04N 7/18* | (2006.01) | |
| *B60R 1/00* | (2006.01) | |
| *B60D 1/24* | (2006.01) | |
| *B60D 1/62* | (2006.01) | |
| *G01B 11/26* | (2006.01) | |
| *G01B 7/30* | (2006.01) | |

(52) U.S. Cl.
CPC .............. *B60W 30/00* (2013.01); *B62D 13/06* (2013.01); *B62D 15/027* (2013.01); *B62D 15/0275* (2013.01); *B62D 15/0285* (2013.01); *G01C 21/32* (2013.01); *G01C 21/3664* (2013.01); *G08G 1/168* (2013.01); *H04N 7/181* (2013.01); *H04N 7/183* (2013.01); *B60R 2300/302* (2013.01); *B60R 2300/607* (2013.01); *B60R 2300/806* (2013.01); *G01B 7/30* (2013.01); *G01B 11/26* (2013.01)

(58) Field of Classification Search
CPC ............ G01C 21/3647; G01C 21/3664; G08G 1/168; B60R 1/00; B60R 2300/105; B62D 15/027; B62D 15/0275; B62D 15/0285; B62D 13/06; B60K 31/0066; G06F 17/5009; B60D 1/245; B60D 1/62; B60W 30/00; H04N 7/181; H04N 7/183

See application file for complete search history.

(56) References Cited

U.S. PATENT DOCUMENTS

| | | |
|---|---|---|
| 3,924,257 A | 12/1975 | Roberts |
| 4,044,706 A | 8/1977 | Gill |
| 4,430,637 A | 2/1984 | Koch-Ducker et al. |
| 4,846,094 A | 7/1989 | Woods |
| 4,848,499 A | 7/1989 | Martinet et al. |
| 4,888,699 A * | 12/1989 | Knoll ................. G01C 21/3614 340/990 |
| 4,897,642 A | 1/1990 | DiLullo et al. |
| 4,947,097 A | 8/1990 | Tao |
| 5,097,250 A | 3/1992 | Hernandez |
| 5,132,851 A | 7/1992 | Bomar et al. |
| 5,155,683 A * | 10/1992 | Rahim ................. G05D 1/0038 180/168 |
| 5,191,328 A | 3/1993 | Nelson |
| 5,235,316 A | 8/1993 | Qualizza |
| 5,247,442 A | 9/1993 | Kendall |
| 5,455,557 A | 10/1995 | Noll et al. |
| 5,461,357 A | 10/1995 | Yoshioka et al. |
| 5,650,764 A | 7/1997 | McCullough |
| 5,690,347 A | 11/1997 | Juergens et al. |
| 5,734,336 A | 3/1998 | Smithline |
| 5,781,662 A | 7/1998 | Mori et al. |
| 5,905,433 A | 5/1999 | Wortham |
| 5,938,704 A * | 8/1999 | Torii ................. G05D 1/0227 180/168 |
| 5,951,035 A | 9/1999 | Phillips, Jr. et al. |
| 5,957,232 A | 9/1999 | Shimizu et al. |
| 5,999,091 A | 12/1999 | Wortham |
| 6,041,582 A | 3/2000 | Tiede et al. |
| 6,100,795 A | 8/2000 | Otterbacher et al. |
| 6,178,650 B1 | 1/2001 | Thibodeaux |
| 6,182,010 B1 | 1/2001 | Berstis |
| 6,198,992 B1 | 3/2001 | Winslow |
| 6,226,226 B1 | 5/2001 | Lill et al. |
| 6,351,698 B1 | 2/2002 | Kubota et al. |
| 6,366,202 B1 | 4/2002 | Rosenthal |
| 6,411,898 B2 | 6/2002 | Ishida et al. |
| 6,434,486 B1 | 8/2002 | Studt et al. |
| 6,480,104 B1 | 11/2002 | Wall et al. |
| 6,483,429 B1 | 11/2002 | Yasui et al. |
| 6,526,335 B1 | 2/2003 | Treyz et al. |
| 6,539,288 B2 | 3/2003 | Ishida et al. |
| 6,573,833 B1 | 6/2003 | Rosenthal |
| 6,577,952 B2 | 6/2003 | Geier et al. |
| 6,580,984 B2 | 6/2003 | Fecher et al. |
| 6,604,592 B2 | 8/2003 | Pietsch et al. |
| 6,643,576 B1 | 11/2003 | O Connor et al. |
| 6,683,539 B2 | 1/2004 | Trajkovic et al. |
| 6,801,125 B1 | 10/2004 | McGregor et al. |
| 6,816,765 B2 | 11/2004 | Yamamoto et al. |
| 6,837,432 B2 | 1/2005 | Tsikos et al. |
| 6,847,916 B1 | 1/2005 | Ying |
| 6,857,494 B2 | 2/2005 | Kobayashi et al. |
| 6,933,837 B2 | 8/2005 | Gunderson et al. |
| 6,959,970 B2 | 11/2005 | Tseng |
| 6,970,184 B2 | 11/2005 | Hirama et al. |
| 6,989,739 B2 | 1/2006 | Li |
| 7,005,974 B2 | 2/2006 | McMahon et al. |
| 7,026,957 B2 | 4/2006 | Rubenstein |
| 7,047,117 B2 | 5/2006 | Akiyama et al. |
| 7,085,634 B2 | 8/2006 | Endo et al. |
| 7,089,101 B2 | 8/2006 | Fischer et al. |
| 7,136,754 B2 | 11/2006 | Hahn et al. |
| 7,142,098 B2 | 11/2006 | Lang et al. |
| 7,154,385 B2 | 12/2006 | Lee et al. |
| 7,161,616 B1 | 1/2007 | Okamoto et al. |
| 7,175,194 B2 | 2/2007 | Ball |
| 7,204,504 B2 | 4/2007 | Gehring et al. |
| 7,207,041 B2 | 4/2007 | Elson et al. |
| 7,220,217 B2 | 5/2007 | Tamai et al. |
| 7,225,891 B2 | 6/2007 | Gehring et al. |
| 7,229,139 B2 | 6/2007 | Lu et al. |
| 7,239,958 B2 | 7/2007 | Grougan et al. |
| 7,266,435 B2 | 9/2007 | Wang et al. |
| 7,309,075 B2 | 12/2007 | Ramsey et al. |

(56) References Cited

U.S. PATENT DOCUMENTS

| | | |
|---|---|---|
| 7,310,084 B2 | 12/2007 | Shitanaka et al. |
| 7,315,299 B2 | 1/2008 | Sunda et al. |
| 7,319,927 B1 | 1/2008 | Sun et al. |
| 7,352,388 B2 | 4/2008 | Miwa et al. |
| 7,353,110 B2 | 4/2008 | Kim |
| 7,366,892 B2 | 4/2008 | Spaur et al. |
| 7,401,871 B2 | 7/2008 | Lu et al. |
| 7,425,889 B2 | 9/2008 | Widmann et al. |
| 7,451,020 B2 | 11/2008 | Goetting et al. |
| 7,463,137 B2 | 12/2008 | Wishart et al. |
| 7,505,784 B2 | 3/2009 | Barbera |
| 7,537,256 B2 | 5/2009 | Gates et al. |
| 7,552,009 B2 | 6/2009 | Nelson |
| 7,602,782 B2 | 10/2009 | Doviak et al. |
| 7,623,952 B2 | 11/2009 | Unruh et al. |
| 7,640,180 B1 | 12/2009 | Slocum et al. |
| 7,689,253 B2 | 3/2010 | Basir |
| 7,690,737 B2 | 4/2010 | Lu |
| 7,692,557 B2 | 4/2010 | Medina et al. |
| 7,693,661 B2 | 4/2010 | Iwasaka |
| 7,715,953 B2 | 5/2010 | Shepard |
| 7,777,615 B2 | 8/2010 | Okuda et al. |
| 7,783,699 B2 | 8/2010 | Rasin et al. |
| 7,786,849 B2 | 8/2010 | Buckley |
| 7,801,941 B2 | 9/2010 | Conneely et al. |
| 7,825,782 B2 | 11/2010 | Hermann |
| 7,827,047 B2 | 11/2010 | Anderson et al. |
| 7,840,347 B2 | 11/2010 | Noguchi |
| 7,904,222 B2 | 3/2011 | Lee et al. |
| 7,907,975 B2 | 3/2011 | Sakamoto et al. |
| 7,917,081 B2 | 3/2011 | Voto et al. |
| 7,932,623 B2 | 4/2011 | Burlak et al. |
| 7,932,815 B2 | 4/2011 | Martinez et al. |
| 7,950,751 B2 | 5/2011 | Offerle et al. |
| 7,969,326 B2 | 6/2011 | Sakakibara |
| 7,974,444 B2 | 7/2011 | Hongo |
| 8,009,025 B2 | 8/2011 | Engstrom et al. |
| 8,010,252 B2 | 8/2011 | Getman et al. |
| 8,019,592 B2 | 9/2011 | Fukuoka et al. |
| 8,024,743 B2 | 9/2011 | Werner |
| 8,033,955 B2 | 10/2011 | FarNsworth |
| 8,036,792 B2 | 10/2011 | Dechamp |
| 8,037,500 B2 | 10/2011 | Margis et al. |
| 8,038,166 B1 | 10/2011 | Piesinger |
| 8,044,776 B2 | 10/2011 | Schofield et al. |
| 8,044,779 B2 | 10/2011 | Hahn et al. |
| 8,121,802 B2 | 2/2012 | Grider et al. |
| 8,131,458 B1 | 3/2012 | Zilka |
| 8,140,138 B2 | 3/2012 | Chrumka |
| 8,150,474 B2 | 4/2012 | Saito et al. |
| 8,165,770 B2 | 4/2012 | Getman et al. |
| 8,169,341 B2 | 5/2012 | Toledo et al. |
| 8,174,576 B2 | 5/2012 | Akatsuka et al. |
| 8,179,238 B2 | 5/2012 | Roberts, Sr. et al. |
| 8,195,145 B2 | 6/2012 | Angelhag |
| 8,205,704 B2 | 6/2012 | Kadowaki et al. |
| 8,244,442 B2 | 8/2012 | Craig et al. |
| 8,245,270 B2 | 8/2012 | Cooperstein et al. |
| 8,255,007 B2 | 8/2012 | Saito et al. |
| 8,267,485 B2 | 9/2012 | Barlsen et al. |
| 8,270,933 B2 | 9/2012 | Riemer et al. |
| 8,280,607 B2 | 10/2012 | Gatti et al. |
| 8,308,182 B2 | 11/2012 | Ortmann et al. |
| 8,310,353 B2 | 11/2012 | Hinninger et al. |
| 8,315,617 B2 | 11/2012 | Tadayon et al. |
| 8,319,618 B2 | 11/2012 | Gomi et al. |
| 8,319,663 B2 | 11/2012 | Von Reyher et al. |
| 8,352,575 B2 | 1/2013 | Samaha |
| 8,362,888 B2 | 1/2013 | Roberts, Sr. et al. |
| 8,370,056 B2 | 2/2013 | Trombley et al. |
| 8,374,749 B2 | 2/2013 | Tanaka |
| 8,380,416 B2 | 2/2013 | Offerle et al. |
| 8,392,066 B2 | 3/2013 | Ehara et al. |
| 8,401,744 B2 | 3/2013 | Chiocco |
| 8,406,956 B2 | 3/2013 | Wey et al. |
| 8,417,263 B2 | 4/2013 | Jenkins et al. |
| 8,417,417 B2 | 4/2013 | Chen et al. |
| 8,417,444 B2 | 4/2013 | Smid et al. |
| 8,427,288 B2 | 4/2013 | Schofield et al. |
| 8,451,107 B2 | 5/2013 | Lu et al. |
| 8,471,691 B2 | 6/2013 | Zhang et al. |
| 8,473,575 B2 | 6/2013 | Marchwicki et al. |
| 8,494,439 B2 | 7/2013 | Faenger |
| 8,498,757 B2 | 7/2013 | Bowden et al. |
| 8,538,785 B2 | 9/2013 | Coleman et al. |
| 8,548,680 B2 | 10/2013 | Ryerson et al. |
| 8,560,175 B2 | 10/2013 | Bammert et al. |
| 8,571,758 B2 | 10/2013 | Klier et al. |
| 8,626,382 B2 | 1/2014 | Obradovich |
| 8,755,984 B2 | 6/2014 | Rupp et al. |
| 8,786,417 B2 | 7/2014 | Holmen et al. |
| 8,788,204 B2 | 7/2014 | Shimizu |
| 8,797,190 B2 | 8/2014 | Kolbe et al. |
| 8,798,860 B2 | 8/2014 | Dechamp |
| 8,807,261 B2 | 8/2014 | Subrt et al. |
| 8,823,796 B2 | 9/2014 | Shen et al. |
| 8,868,329 B2 | 10/2014 | Ikeda et al. |
| 8,888,120 B2 | 11/2014 | Trevino |
| 8,892,360 B2 | 11/2014 | Otani |
| 8,909,426 B2 | 12/2014 | Rhode et al. |
| 8,928,757 B2 | 1/2015 | Maekawa et al. |
| 8,930,140 B2 | 1/2015 | Trombley et al. |
| 9,008,913 B1 | 4/2015 | Sears et al. |
| 9,013,286 B2 | 4/2015 | Chen et al. |
| 9,042,603 B2 | 5/2015 | Elwart et al. |
| 9,082,315 B2 | 7/2015 | Lin et al. |
| 9,094,583 B2 | 7/2015 | Shih et al. |
| 9,102,271 B2 | 8/2015 | Trombley et al. |
| 9,114,832 B2 | 8/2015 | Wang et al. |
| 9,120,359 B2 | 9/2015 | Chiu et al. |
| 9,132,856 B2 | 9/2015 | Shepard |
| 9,208,686 B2 | 12/2015 | Takamatsu |
| 9,248,858 B2 | 2/2016 | Lavoie et al. |
| 9,335,162 B2 | 5/2016 | Kyrtsos et al. |
| 2002/0005780 A1 | 1/2002 | Ehrlich et al. |
| 2002/0098853 A1 | 7/2002 | Chrumka |
| 2002/0111118 A1* | 8/2002 | Klitsner ............ A63H 17/395 446/484 |
| 2003/0079123 A1 | 4/2003 | Mas Ribes |
| 2003/0147534 A1 | 8/2003 | Ablay et al. |
| 2003/0222982 A1 | 12/2003 | Hamdan et al. |
| 2003/0234512 A1 | 12/2003 | Holub |
| 2004/0119822 A1 | 6/2004 | Custer et al. |
| 2004/0203660 A1 | 10/2004 | Tibrewal et al. |
| 2004/0207525 A1 | 10/2004 | Wholey et al. |
| 2004/0260438 A1 | 12/2004 | Chernetsky et al. |
| 2005/0000738 A1 | 1/2005 | Gehring et al. |
| 2005/0073433 A1 | 4/2005 | Gunderson et al. |
| 2005/0074143 A1 | 4/2005 | Kawai |
| 2005/0091408 A1 | 4/2005 | Parupudi et al. |
| 2005/0128059 A1 | 6/2005 | Vause |
| 2005/0146607 A1 | 7/2005 | Linn et al. |
| 2005/0168331 A1 | 8/2005 | Gunderson |
| 2005/0177635 A1 | 8/2005 | Schmidt et al. |
| 2005/0206225 A1 | 9/2005 | Offerle et al. |
| 2005/0206231 A1 | 9/2005 | Lu et al. |
| 2005/0206299 A1 | 9/2005 | Nakamura et al. |
| 2005/0236201 A1 | 10/2005 | Spannheimer et al. |
| 2005/0236896 A1 | 10/2005 | Offerle et al. |
| 2006/0071447 A1 | 4/2006 | Gehring et al. |
| 2006/0076828 A1 | 4/2006 | Lu et al. |
| 2006/0089794 A1* | 4/2006 | DePasqua ............ G01C 21/203 701/532 |
| 2006/0092129 A1 | 5/2006 | Choquet et al. |
| 2006/0103511 A1 | 5/2006 | Lee et al. |
| 2006/0111820 A1 | 5/2006 | Goetting et al. |
| 2006/0142936 A1 | 6/2006 | Dix |
| 2006/0156315 A1 | 7/2006 | Wood et al. |
| 2006/0190097 A1 | 8/2006 | Rubenstein |
| 2006/0238538 A1* | 10/2006 | Kapler ............ G06Q 10/06 345/440 |
| 2006/0244579 A1 | 11/2006 | Raab |
| 2006/0250501 A1 | 11/2006 | Widmann et al. |

(56) References Cited

U.S. PATENT DOCUMENTS

| | | | |
|---|---|---|---|
| 2006/0276959 A1* | 12/2006 | Matsuoka | G01C 21/3664 701/431 |
| 2006/0287821 A1 | 12/2006 | Lin | |
| 2006/0293800 A1 | 12/2006 | Bauer et al. | |
| 2007/0027581 A1 | 2/2007 | Bauer et al. | |
| 2007/0057816 A1 | 3/2007 | Sakakibara et al. | |
| 2007/0106466 A1* | 5/2007 | Noguchi | G01C 21/3614 701/418 |
| 2007/0132560 A1 | 6/2007 | Nystrom et al. | |
| 2007/0132573 A1 | 6/2007 | Quach et al. | |
| 2007/0198190 A1 | 8/2007 | Bauer et al. | |
| 2007/0216136 A1 | 9/2007 | Dietz | |
| 2007/0260395 A1* | 11/2007 | Matsuoka | G01C 21/3614 701/425 |
| 2008/0027599 A1* | 1/2008 | Logan | G05D 1/0234 701/23 |
| 2008/0027635 A1 | 1/2008 | Tengler et al. | |
| 2008/0148374 A1 | 6/2008 | Spaur et al. | |
| 2008/0177443 A1 | 7/2008 | Lee et al. | |
| 2008/0180526 A1 | 7/2008 | Trevino | |
| 2008/0186384 A1 | 8/2008 | Ishii et al. | |
| 2008/0231701 A1 | 9/2008 | Greenwood et al. | |
| 2008/0312792 A1 | 12/2008 | Dechamp | |
| 2008/0313050 A1 | 12/2008 | Basir | |
| 2009/0005932 A1 | 1/2009 | Lee et al. | |
| 2009/0045924 A1 | 2/2009 | Roberts, Sr. et al. | |
| 2009/0063053 A1 | 3/2009 | Basson et al. | |
| 2009/0075624 A1 | 3/2009 | Cox et al. | |
| 2009/0079828 A1 | 3/2009 | Lee et al. | |
| 2009/0082935 A1 | 3/2009 | Leschuk et al. | |
| 2009/0093928 A1 | 4/2009 | Getman et al. | |
| 2009/0106036 A1 | 4/2009 | Tamura et al. | |
| 2009/0117890 A1 | 5/2009 | Jacobsen et al. | |
| 2009/0140064 A1 | 6/2009 | Schultz et al. | |
| 2009/0219147 A1 | 9/2009 | Bradley et al. | |
| 2009/0228166 A1* | 9/2009 | Durkos | G05D 1/0246 701/26 |
| 2009/0228207 A1* | 9/2009 | Sasano | G01C 21/3614 701/414 |
| 2009/0253466 A1 | 10/2009 | Saito et al. | |
| 2009/0271078 A1 | 10/2009 | Dickinson | |
| 2009/0306854 A1 | 12/2009 | Dechamp | |
| 2009/0318119 A1 | 12/2009 | Basir et al. | |
| 2010/0060739 A1 | 3/2010 | Salazar | |
| 2010/0063670 A1 | 3/2010 | Brzezinski et al. | |
| 2010/0098853 A1 | 4/2010 | Hoffmann et al. | |
| 2010/0114471 A1 | 5/2010 | Sugiyama et al. | |
| 2010/0152989 A1 | 6/2010 | Smith et al. | |
| 2010/0156671 A1 | 6/2010 | Lee et al. | |
| 2010/0157061 A1 | 6/2010 | Katsman et al. | |
| 2010/0171828 A1 | 7/2010 | Ishii | |
| 2010/0174422 A1* | 7/2010 | Jacobsen | G05D 1/0044 701/2 |
| 2010/0191421 A1 | 7/2010 | Nilsson | |
| 2010/0198491 A1 | 8/2010 | Mays | |
| 2010/0222964 A1 | 9/2010 | Dechamp | |
| 2010/0234071 A1 | 9/2010 | Shabtay et al. | |
| 2010/0305815 A1 | 12/2010 | Trueman et al. | |
| 2010/0306309 A1 | 12/2010 | Santori et al. | |
| 2010/0324770 A1 | 12/2010 | Ramsey et al. | |
| 2011/0022282 A1 | 1/2011 | Wu et al. | |
| 2011/0025482 A1 | 2/2011 | Alguera et al. | |
| 2011/0063425 A1 | 3/2011 | Tieman | |
| 2011/0088659 A1 | 4/2011 | Wang et al. | |
| 2011/0102583 A1 | 5/2011 | Kinzalow | |
| 2011/0110530 A1 | 5/2011 | Kimura | |
| 2011/0112721 A1 | 5/2011 | Wang et al. | |
| 2011/0112762 A1 | 5/2011 | Gruijters et al. | |
| 2011/0125457 A1 | 5/2011 | Lee et al. | |
| 2011/0129093 A1 | 6/2011 | Karam et al. | |
| 2011/0140872 A1 | 6/2011 | McClure | |
| 2011/0149077 A1 | 6/2011 | Robert | |
| 2011/0153198 A1 | 6/2011 | Kokkas et al. | |
| 2011/0160956 A1 | 6/2011 | Chung et al. | |
| 2011/0181457 A1 | 7/2011 | Basten | |
| 2011/0185390 A1 | 7/2011 | Faenger et al. | |
| 2011/0195659 A1 | 8/2011 | Boll et al. | |
| 2011/0216199 A1 | 9/2011 | Trevino et al. | |
| 2011/0257860 A1 | 10/2011 | Getman et al. | |
| 2011/0281522 A1 | 11/2011 | Suda | |
| 2011/0296037 A1 | 12/2011 | Westra et al. | |
| 2012/0004805 A1 | 1/2012 | Gray et al. | |
| 2012/0062743 A1 | 3/2012 | Lynam et al. | |
| 2012/0062744 A1 | 3/2012 | Schofield et al. | |
| 2012/0065815 A1 | 3/2012 | Hess | |
| 2012/0079002 A1 | 3/2012 | Boll et al. | |
| 2012/0084292 A1 | 4/2012 | Liang et al. | |
| 2012/0086808 A1 | 4/2012 | Lynam et al. | |
| 2012/0095649 A1 | 4/2012 | Klier et al. | |
| 2012/0185131 A1 | 7/2012 | Headley | |
| 2012/0191285 A1 | 7/2012 | Woolf et al. | |
| 2012/0200706 A1 | 8/2012 | Greenwood et al. | |
| 2012/0224059 A1 | 9/2012 | Takamatsu | |
| 2012/0265416 A1 | 10/2012 | Lu et al. | |
| 2012/0271512 A1 | 10/2012 | Rupp et al. | |
| 2012/0271514 A1 | 10/2012 | Lavoie et al. | |
| 2012/0271515 A1 | 10/2012 | Rhode et al. | |
| 2012/0271522 A1 | 10/2012 | Rupp et al. | |
| 2012/0283909 A1 | 11/2012 | Dix | |
| 2012/0283910 A1 | 11/2012 | Lee et al. | |
| 2012/0288156 A1 | 11/2012 | Kido | |
| 2012/0290150 A1* | 11/2012 | Doughty | G08G 1/0116 701/2 |
| 2012/0314073 A1 | 12/2012 | Shimoda et al. | |
| 2012/0316732 A1 | 12/2012 | Auer | |
| 2013/0006472 A1 | 1/2013 | McClain et al. | |
| 2013/0024064 A1 | 1/2013 | Shepard | |
| 2013/0027195 A1 | 1/2013 | Van Wiemeersch et al. | |
| 2013/0038436 A1 | 2/2013 | Brey et al. | |
| 2013/0041524 A1 | 2/2013 | Brey | |
| 2013/0057397 A1 | 3/2013 | Cutler et al. | |
| 2013/0076007 A1 | 3/2013 | Goode et al. | |
| 2013/0148748 A1 | 6/2013 | Suda | |
| 2013/0158803 A1 | 6/2013 | Headley | |
| 2013/0158863 A1 | 6/2013 | Skvarce et al. | |
| 2013/0226390 A1 | 8/2013 | Luo et al. | |
| 2013/0250114 A1 | 9/2013 | Lu | |
| 2013/0253814 A1 | 9/2013 | Wirthlin | |
| 2013/0268160 A1 | 10/2013 | Trombley et al. | |
| 2014/0005918 A1 | 1/2014 | Qiang | |
| 2014/0012465 A1 | 1/2014 | Shank et al. | |
| 2014/0025260 A1 | 1/2014 | McClure | |
| 2014/0052337 A1 | 2/2014 | Lavoie et al. | |
| 2014/0058614 A1 | 2/2014 | Trombley et al. | |
| 2014/0058622 A1 | 2/2014 | Trombley et al. | |
| 2014/0058655 A1 | 2/2014 | Trombley et al. | |
| 2014/0058668 A1 | 2/2014 | Trombley et al. | |
| 2014/0074743 A1 | 3/2014 | Rademaker | |
| 2014/0085472 A1 | 3/2014 | Lu et al. | |
| 2014/0088797 A1 | 3/2014 | McClain et al. | |
| 2014/0088824 A1 | 3/2014 | Ishimoto | |
| 2014/0121883 A1 | 5/2014 | Shen et al. | |
| 2014/0121930 A1 | 5/2014 | Allexi et al. | |
| 2014/0156148 A1 | 6/2014 | Kikuchi | |
| 2014/0160276 A1 | 6/2014 | Pliefke et al. | |
| 2014/0172232 A1 | 6/2014 | Rupp et al. | |
| 2014/0188344 A1 | 7/2014 | Lavoie | |
| 2014/0188346 A1 | 7/2014 | Lavoie | |
| 2014/0210456 A1 | 7/2014 | Crossman | |
| 2014/0218506 A1 | 8/2014 | Trombley et al. | |
| 2014/0218522 A1 | 8/2014 | Lavoie et al. | |
| 2014/0222288 A1 | 8/2014 | Lavoie et al. | |
| 2014/0229101 A1* | 8/2014 | Glaser | G01C 21/34 701/487 |
| 2014/0236532 A1 | 8/2014 | Trombley et al. | |
| 2014/0249691 A1 | 9/2014 | Hafner et al. | |
| 2014/0267688 A1 | 9/2014 | Aich et al. | |
| 2014/0267689 A1 | 9/2014 | Lavoie | |
| 2014/0267727 A1 | 9/2014 | Alaniz | |
| 2014/0267868 A1 | 9/2014 | Mazzola et al. | |
| 2014/0267869 A1 | 9/2014 | Sawa | |
| 2014/0277941 A1 | 9/2014 | Chiu et al. | |
| 2014/0277942 A1 | 9/2014 | Kyrtsos et al. | |

(56) References Cited

U.S. PATENT DOCUMENTS

| | | | |
|---|---|---|---|
| 2014/0297128 A1 | 10/2014 | Lavoie et al. | |
| 2014/0297129 A1 | 10/2014 | Lavoie et al. | |
| 2014/0303847 A1 | 10/2014 | Lavoie | |
| 2014/0309888 A1 | 10/2014 | Smit et al. | |
| 2014/0324295 A1 | 10/2014 | Lavoie | |
| 2014/0343795 A1 | 11/2014 | Lavoie | |
| 2014/0361955 A1 | 12/2014 | Goncalves | |
| 2014/0371979 A1* | 12/2014 | Drew | A01B 79/005 701/32.3 |
| 2014/0379217 A1 | 12/2014 | Rupp et al. | |
| 2015/0002670 A1 | 1/2015 | Bajpai | |
| 2015/0057903 A1 | 2/2015 | Rhode et al. | |
| 2015/0066296 A1 | 3/2015 | Trombley et al. | |
| 2015/0094945 A1* | 4/2015 | Cheng | G01C 21/34 701/408 |
| 2015/0115571 A1 | 4/2015 | Zhang et al. | |
| 2015/0120141 A1 | 4/2015 | Lavoie et al. | |
| 2015/0120143 A1 | 4/2015 | Schlichting | |
| 2015/0134183 A1 | 5/2015 | Lavoie et al. | |
| 2015/0138340 A1 | 5/2015 | Lavoie | |
| 2015/0142211 A1* | 5/2015 | Shehata | H04N 7/181 701/2 |
| 2015/0158527 A1 | 6/2015 | Hafner et al. | |
| 2015/0165850 A1 | 6/2015 | Chiu et al. | |
| 2015/0179075 A1 | 6/2015 | Lee | |
| 2015/0197278 A1 | 7/2015 | Boos et al. | |
| 2015/0203156 A1 | 7/2015 | Hafner et al. | |
| 2015/0210317 A1 | 7/2015 | Hafner et al. | |
| 2015/0217692 A1 | 8/2015 | Yanagawa | |
| 2015/0217693 A1 | 8/2015 | Pliefke et al. | |
| 2015/0232031 A1 | 8/2015 | Kitaura et al. | |
| 2015/0232092 A1 | 8/2015 | Fairgrieve et al. | |
| 2015/0234386 A1* | 8/2015 | Zini | G05D 1/0274 701/26 |
| 2015/0360528 A1* | 12/2015 | McCall | B60D 1/28 280/512 |
| 2016/0152263 A1* | 6/2016 | Singh | B60T 8/1708 701/41 |

FOREIGN PATENT DOCUMENTS

| | | |
|---|---|---|
| CN | 202541524 U | 11/2012 |
| DE | 3931518 A1 | 4/1991 |
| DE | 9208595 U1 | 8/1992 |
| DE | 10065230 A1 | 7/2002 |
| DE | 10154612 A1 | 5/2003 |
| DE | 102005043467 A1 | 3/2007 |
| DE | 102005043468 A1 | 3/2007 |
| DE | 102006035021 | 1/2008 |
| DE | 102006048947 A1 | 4/2008 |
| DE | 102008020838 A1 | 11/2008 |
| DE | 102009012253 A1 | 9/2010 |
| DE | 102010004920 A1 | 7/2011 |
| DE | 102008004158 B4 | 10/2011 |
| DE | 102008004159 B4 | 10/2011 |
| DE | 102008004160 B4 | 10/2011 |
| DE | 102010021052 A1 | 11/2011 |
| DE | 102011108440 A1 | 1/2013 |
| EP | 0418653 A1 | 3/1991 |
| EP | 0849144 A2 | 6/1998 |
| EP | 1361543 A2 | 11/2003 |
| EP | 1695888 A2 | 8/2006 |
| EP | 1593552 B1 | 3/2007 |
| EP | 2168815 A1 | 3/2010 |
| EP | 2199188 A2 | 6/2010 |
| EP | 2452549 A1 | 5/2012 |
| EP | 2551132 A1 | 1/2013 |
| EP | 2644477 A1 | 10/2013 |
| EP | 1569073 B1 | 9/2014 |
| EP | 2803944 A2 | 11/2014 |
| FR | 2515379 A1 | 10/1981 |
| FR | 2606717 A1 | 5/1988 |
| FR | 2716145 A1 | 8/1995 |
| FR | 2786456 A1 | 6/2000 |
| FR | 2980750 A1 | 4/2013 |
| GB | 2265587 A | 10/1993 |
| GB | 2342630 A | 4/2000 |
| GB | 2398048 A | 8/2004 |
| GB | 2398049 A | 8/2004 |
| GB | 2398050 A | 8/2004 |
| JP | 63-085568 | 6/1988 |
| JP | 06-028598 A | 4/1994 |
| JP | 2003148938 A | 5/2003 |
| JP | 2003175852 A | 6/2003 |
| JP | 2004114879 A | 4/2004 |
| JP | 3716722 B2 | 11/2005 |
| JP | 2008027138 A | 2/2008 |
| JP | 2008123028 A | 5/2008 |
| JP | 2009171122 A | 7/2009 |
| JP | 2012166647 A | 9/2012 |
| JP | 2014034289 A | 2/2014 |
| KR | 20060012710 A | 2/2006 |
| KR | 20060133750 A | 12/2006 |
| KR | 20110114897 A | 10/2011 |
| KR | 20140105199 A | 9/2014 |
| TW | 200930010 A | 7/2009 |
| WO | 8503263 A1 | 8/1985 |
| WO | 2011117372 A1 | 9/2011 |
| WO | 2014019730 A1 | 2/2014 |
| WO | 2014037500 A1 | 3/2014 |
| WO | 2014123575 A1 | 8/2014 |
| WO | 2015074027 A1 | 5/2015 |

OTHER PUBLICATIONS

Whitfield, Kermit, "A Hitchhiker's Guide to the Telematics Ecosystem", Automotive Design & Production, Oct. 1, 2003, 3 pgs.

Narasimhan, N.; Janssen, C.; Pearce, M.; Song, Y., "A Lightweight Remote Display Management Protocol for Mobile Devices", 2007, IEEE, pp. 711-715.

Microsoft, Navigation System, Sync Powered by Microsoft, Ford Motor Company, Jul. 2007, 164 pgs.

Microsoft, Supplemental Guide, Sync Powered by Microsoft, Ford Motor Company, Nov. 2007, 86 pgs.

Voelcker, J., "Top 10 Tech Cars: It's the Environment, Stupid", IEEE Spectrum, Apr. 2008, pp. 26-35.

Microsoft, Navigation System, Sync Powered by Microsoft, Ford Motor Company, Oct. 2008, 194 pgs.

Microsoft, Supplemental Guide, Sync Powered by Microsoft, Ford Motor Company, Oct. 2008, 83 pgs.

Chantry, Darryl, "Mapping Applications to the Cloud", Microsoft Corporation, Jan. 2009, 20 pgs.

Yarden, Raam; Surage Jr., Chris; Kim, Chong IL; Doboli, Alex; Voisan, Emil; Purcaru, Constantin, "TUKI: A Voice-Activated Information Browser", 2009, IEEE, pp. 1-5.

Gil-Castiñeira, Felipe; Chaves-Diéguez, David; González-Castaño, Francisco J., "Integration of Nomadic Devices with Automotive User Interfaces", IEEE Transactions on Consumer Electronics, Feb. 2009, vol. 55, Issue 1, pp. 34-41.

Microsoft, Navigation System, Sync Powered by Microsoft, Ford Motor Company, Jul. 2009, 196 pgs.

Microsoft, Supplemental Guide, Sync Powered by Microsoft, Ford Motor Company, Aug. 2009, 87 pgs.

Goodwin, Antuan, "Ford Unveils Open-Source Sync Developer Platform", The Car Tech Blog, Oct. 29, 2009, 5 pgs. [Retrieved from http://reviews.cnet.com/8301-13746_7-10385619-48.html on Feb. 15, 2011].

Lamberti, Ralf, "Full Circle: The Rise of Vehicle-Installed Telematics",Telematics Munich, Nov. 10, 2009, 12 pgs.

"Apple Files Patent Which Could Allow You to Control Your Computer Remotely Using iPhone", Dec. 18, 2009, 7 pgs [Retrieved from www.iphonehacks.com on Jun. 22, 2010].

Newmark, Zack, "Student develop in-car cloud computing apps; envision the future of in-car connectivity", May 4, 2010, 3 pgs [Retrieved from www.worldcarfans.com on Jun. 18, 2010].

"Service Discovery Protocol (SDP)", Palo Wireless Bluetooth Resource Center, 7 pgs [Retrieved from http://palowireless.com/infotooth/tutorial/sdp.asp on Aug. 3, 2010].

(56) References Cited

OTHER PUBLICATIONS

Sonnenberg, Jan, "Service and User Interface Transfer from Nomadic Devices to Car Infotainment Systems", Second International Conference on Automotive User Interfaces and Interactive Vehicular Applications (Automotive UI), Nov. 11-12, 2010, pp. 162-165.
"MobileSafer makes it easy to keep connected and safe", ZoomSafer Inc., 2010, 5 pgs. [Retrieved from http://zoomsafer.com/products/mobilesafer on Dec. 28, 2010].
"PhonEnforcer FAQs", Turnoffthecellphone.com, 3 pgs. [Retrieved from http://turnoffthecellphone.com/faq.html on Dec. 28, 2010].
"How PhonEnforcer Works", Turnoffthecellphone.com, 2 pgs. [Retrieved from http://turnoffthecellphone.com/howitworks.htm on Dec. 28, 2010].
European Patent Office, European Search Report for Application No. EP11151623, Feb. 15, 2011, 7 pgs.
Wikipedia, "X Window System", Wikipedia, The Free Encyclopedia, date unknown, 19 pgs. [Retrieved from http://en.wikipedia.org/w/index.php?title=X_Window_System&oldid=639253038].
"Ford Super Duty: Truck Technology", Brochure, www.media.ford.com, Sep. 2011, pp. 1-2.
"Ford Guide to Towing", Trailer Life, Magazine, 2012, pp. 1-38.
"Dodge Dart: The Hot Compact Car", Brochure, www.dart-mouth.com/enginerring-development.html, pp. 1-6; date unknown.
M. Wagner, D. Zoebel, and A. Meroth, "Adaptive Software and Systems Architecture for Driver Assistance Systems" International Journal of Machine Learning and Computing, Oct. 2011, vol. 1, No. 4, pp. 359-365.
Christian Lundquist, Wolfgang Reinelt, Olof Enqvist, "Back Driving Assistant for Passenger Cars with Trailer", SAE Int'l, ZF Lenksysteme Gmbh, Schwaebisch Gmuend, Germany, 2006, pp. 1-8.
"Understanding Tractor-Trailer Performance", Caterpillar, 2006, pp. 1-28.
Divelbiss, A.W.; Wen, J.T.; "Trajectory Tracking Control of a Car-Trailer System", IEEE, Control Systems Technology, Aug. 6, 2002, vol. 5, No. 3, ISSN: 1063-6536, pp. 269-278.
Stahn, R.; Heiserich, G.; Stopp, A., "Laser Scanner-Based Navigation for Commercial Vehicles", IEEE, Intelligent Vehicles Symposium, Jun. 2007, pp. 969-974, print ISBN: 1931-0587.
Widrow, B.; Lamego, M.M., "Neurointerfaces: Applications", IEEE, Adaptive Systems for Signal Processing, Communications, and Control Symposium, Oct. 2000, pp. 441-444.
Dieter Zoebel, David Polock, Philipp Wojke, "Steering Assistance for Backing Up Articulated Vehicles", Systemics, Cybernetics and Informatics, Universitaet Koblenz-Landau, Germany, vol. 1, No. 5, pp. 101-106; date unknown.
Stephen K. Young, Carol A. Eberhard, Philip J. Moffa, "Development of Performance Specifications for Collision Avoidance Systems for Lane Change, Merging and Backing", TRW Space and Electronics Group, Feb. 1995, pp. 1-31.
Ford Motor Company, "09 F-150", Brochure, www.fordvehicles.com, pp. 1-30; date unknown.
Michael Paine, "Heavy Vehicle Object Detection Systems", Vehicle Design and Research Pty Lmited for VicRoads, Jun. 2003, pp. 1-22.
Claudio Altafini, Alberto Speranzon, and Karl Henrik Johansson, "Hybrid Control of a Truck and Trailer Vehicle", Springer-Verlag Berlin Heidelberg, HSCC 2002, LNCS 2289; 2002, pp. 21-34.
"2012 Edge—Trailer Towing Selector", Brochure, Preliminary 2012 RV & Trailer Towing Guide Information, pp. 1-3.
"Meritor Wabco Reverse Detection Module for Trailers with 12-Volt Constant Power Systems", Technical Bulletin, TP-02172, Revised 10-04, pp. 1-8.
Simonoff, Adam J., "USH0001469 Remotely Piloted Vehicle Control and Interface System", Aug. 1, 1995, pp. 1-7.
"Range Rover Evoque's Surround Camera System"; MSN Douglas Newcomb Jun. 15, 2012, pp. 1-2.
"Electronic Trailer Steering", VSE, Advanced Steering & Suspension Solutions, Brochure, 2009, The Netherlands, pp. 1-28.
"WABCO Electronic Braking System—New Generation", Vehicle Control Systems—An American Standard Company, www.wabco-auto.com, 2004, pp. 1-8.
T. Wang, "Reverse-A-Matic-Wheel Direction Sensor System Operation and Installation Manual", Dec. 15, 2005, pp. 1-9.
"Wireless-Enabled Microphone, Speaker and User Interface for a Vehicle", The IP.com, Aug. 26, 2004, pp. 1-5, IP.com disclosure No. IPCOM000030782D.
"RFID Read/Write Module", Grand Idea Studio, 2013, pp. 1-3, website, http://www.grandideastudio.com/portfolio/rfidread-write-module/.
Laszlo Palkovics, Pal Michelberger, Jozsef Bokor, Peter Gaspar, "Adaptive Identification for Heavy-Truck Stability Control", Vehicle Systems Dynamics Supplement, vol. 25, No. sup1, 1996, pp. 502-518.
"Convenience and Loadspace Features" Jaguar Land Rover Limited, 2012, pp. 1-15, http://www.landrover.com/us/en/lr/all-new-range-rover/explore/.
"Delphi Lane Departure Warning", Delphi Corporation, Troy, Michigan pp. 1-2; date unknown.
Micah Steele, R. Brent Gillespie, "Shared Control Between Human and Machine: Using a Haptic Steering Wheel to Aid in Land Vehicle Guidance", University of Michigan, pp. 1-5; date unknown.
"Electric Power Steering", Toyota Hybrid System Diagnosis-Course 072, Section 7, pp. 1-10; date unknown.
"Telematics Past, Present, and Future," Automotive Service Association, www.ASAshop.org, May 2008, 20 pgs.
"Fully Automatic Trailer Tow Hitch With LIN Bus," https://webista.bmw.com/webista/show?id=1860575499&lang=engb&print=1, pp. 1-5; date unknown.
Jung-Hoon Hwang, Ronald C. Arkin, and Dong-Soo Kwon; "Mobile robots at your fingertip: Bezier curve on-line trajectory generation for supervisory control," IEEE/RSJ, International Conference on Intelligent Robots and Systems, Las Vegas, Nevada, Oct. 2003, 6 pages.
M. Khatib, H. Jaouni, R. Chatila, and J.P. Laumond; "Dynamic Path Modification for Car-Like Nonholonomic Mobile Robots," IEEE, International Conference on Robotics and Automation, Albuquerque, New Mexico, Apr. 1997, 6 pages.

\* cited by examiner

SYSTEM AND METHOD OF INPUTTING AN INTENDED BACKING PATH

CROSS-REFERENCE TO RELATED APPLICATIONS

This patent application is continuation-in-part of U.S. patent application Ser. No. 14/289,888, which was filed on May 29, 2014, entitled "DISPLAY SYSTEM UTILIZING VEHICLE AND TRAILER DYNAMICS," which is a continuation-in-part of U.S. patent application Ser. No. 14/256,427, which was filed on Apr. 18, 2014, entitled "CONTROL FOR TRAILER BACKUP ASSIST SYSTEM," which is a continuation-in-part of U.S. patent application Ser. No. 14/249,781, which was filed on Apr. 10, 2014, entitled "SYSTEM AND METHOD FOR CALCULATING A HORIZONTAL CAMERA TO TARGET DISTANCE," which is a continuation-in-part of U.S. patent application Ser. No. 14/188,213, which was filed on Feb. 24, 2014, entitled "SENSOR SYSTEM AND METHOD FOR MONITORING TRAILER HITCH ANGLE," which is a continuation-in-part of U.S. patent application Ser. No. 13/847,508, which was filed on Mar. 20, 2013, entitled "HITCH ANGLE ESTIMATION." U.S. patent application Ser. No. 14/188,213 is also a continuation-in-part of U.S. patent application Ser. No. 14/068,387, which was filed on Oct. 31, 2013, entitled "TRAILER MONITORING SYSTEM AND METHOD," which is a continuation-in-part of U.S. patent application Ser. No. 14/059,835, which was filed on Oct. 22, 2013, entitled "TRAILER BACKUP ASSIST SYSTEM," which is a continuation-in-part of U.S. patent application Ser. No. 13/443,743 which was filed on Apr. 10, 2012, entitled "DETECTION OF AND COUNTERMEASURES FOR JACKKNIFE ENABLING CONDITIONS DURING TRAILER BACKUP ASSIST," which is a continuation-in-part of U.S. patent application Ser. No. 13/336,060, which was filed on Dec. 23, 2011, entitled "TRAILER PATH CURVATURE CONTROL FOR TRAILER BACKUP ASSIST," which claims benefit from U.S. Provisional patent application No. 61/477,132, which was filed on Apr. 19, 2011, entitled "TRAILER BACKUP ASSIST CURVATURE CONTROL." U.S. patent application Ser. No. 14/249,781 is also a continuation-in-part of U.S. patent application Ser. No. 14/161,832 which was filed Jan. 23, 2014, entitled "SUPPLEMENTAL VEHICLE LIGHTING SYSTEM FOR VISION BASED TARGET DETECTION," which is a continuation-in-part of U.S. patent application Ser. No. 14/059,835 which was filed on Oct. 22, 2013, entitled "TRAILER BACKUP ASSIST SYSTEM." Furthermore, U.S. patent application Ser. No. 14/249,781 is a continuation-in-part of U.S. application Ser. No. 14/201,130 which was filed on Mar. 7, 2014, entitled "SYSTEM AND METHOD OF CALIBRATING A TRAILER BACKUP ASSIST SYSTEM," which is a continuation-in-part of U.S. patent application Ser. No. 14/068,387, which was filed on Oct. 31, 2013, entitled "TRAILER MONITORING SYSTEM AND METHOD." The aforementioned related applications are hereby incorporated by reference in their entirety.

FIELD OF THE INVENTION

The disclosure made herein generally relates to driver assist and active safety technologies in vehicles, and more particularly to systems for inputting an intended path of a vehicle and a trailer using a display.

BACKGROUND OF THE INVENTION

Operating a vehicle that is connected to a trailer is very challenging for many drivers. Thus, there is a need for a system allowing a user to input an intended path in a simple yet intuitive manner.

SUMMARY OF THE INVENTION

According to one aspect of the present invention, a path input system is provided. The system includes at least one imaging device for generating image data. A GPS device is included for generating satellite image data. A controller is included for generating an aerial view of a vehicle and a trailer based on the image data and the satellite data. A display is included for displaying the aerial view and registering a touch event thereon that inputs an intended path for the vehicle and the trailer.

According to another aspect of the present invention, a path input system is provided. The system includes a controller for generating an aerial view of a vehicle and a trailer amidst an operating environment. A display is included for displaying the aerial view on a touch screen that is configured to register a first touch event that inputs an intended backing path for the vehicle and the trailer and a second touch event that modifies the intended backing path.

According to yet another aspect of the invention, a path input system is provided. The system includes a controller for generating an aerial view of a vehicle and a trailer, and a display for displaying the aerial view on a touch screen configured to register a first touch event that inputs an intended backing path for the vehicle and trailer.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Backing and maneuvering a trailer can be a difficult task due to challenges in vision and path prediction. Challenges may vary based on vehicle dimensions, trailer dimensions, and environmental conditions. With large trailers a field of view behind the trailer may be completely occluded. With smaller trailers, small changes in steering can cause a hitch angle between the vehicle tow and the trailer to inflect quickly. In view of these and other concerns, the following improvements provide various implementations to bolster the functionality of a trailer backup assist system.

Backing and maneuvering a trailer can be a difficult task due to challenges in vision and path prediction. Challenges may vary based on vehicle dimensions, trailer dimensions, and environmental conditions. With large trailers a field of view behind the trailer may be completely occluded. With smaller trailers, small changes in steering can cause a hitch angle between the vehicle tow and the trailer to inflect quickly. In view of these and other concerns, the following improvements provide various implementations to bolster the functionality of a trailer backup assist system.

Figure 1:
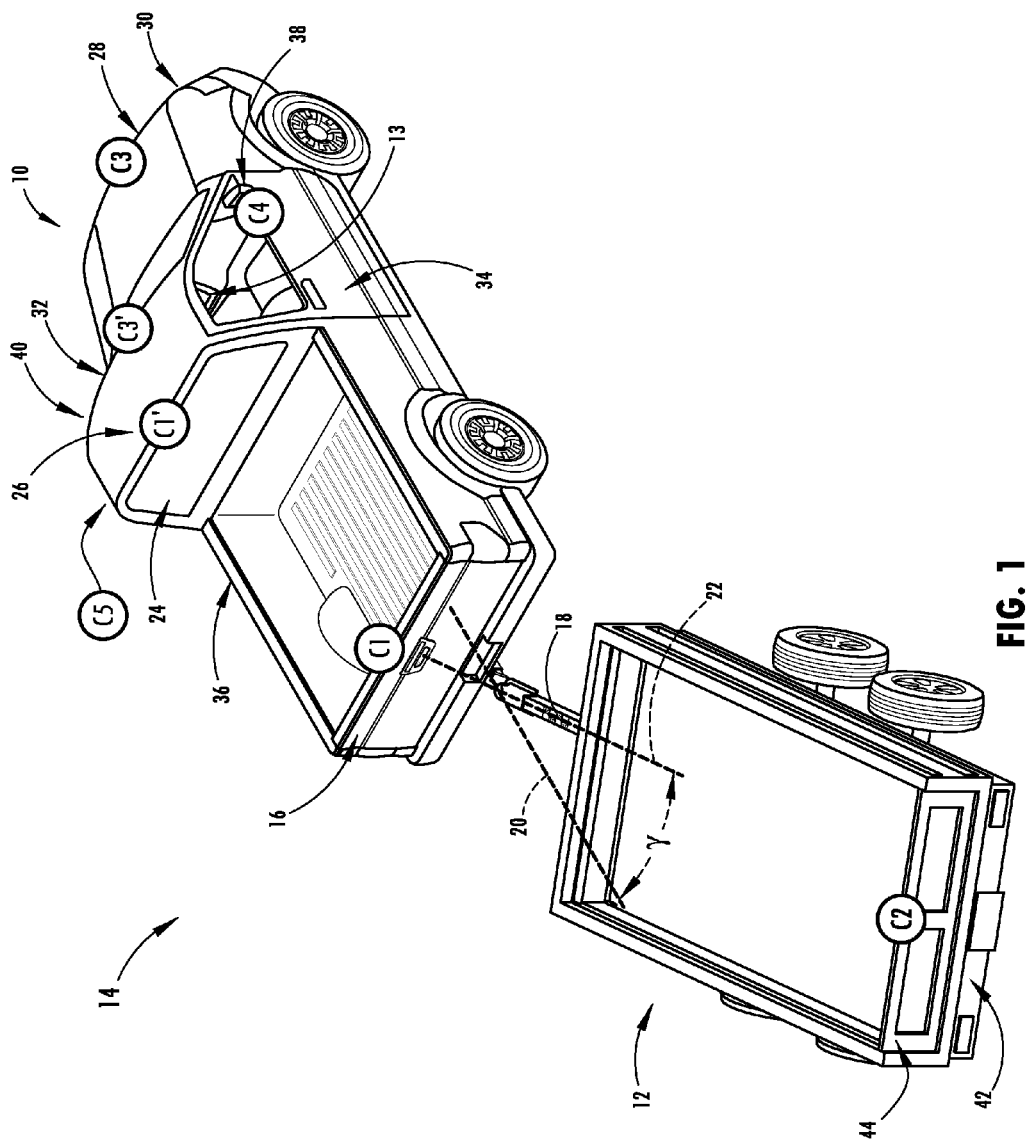
FIG. 1 is a is a schematic diagram illustrating imaging devices located on a vehicle or a trailer that is attached to the vehicle.

As shown in FIG. 1, the imaging devices C1-C5 may be arranged in various locations such that each field of view of the imaging devices C1-C5 is configured to capture a significantly different area of the operating environment 14. Each of the imaging devices C1-C5 may include any form of imaging device configured to capture image data such as, but not limited to, charge coupled device (CCD) and complementary metal oxide semiconductor (CMOS) image sensors. Although five imaging devices C1-C5 are discussed in reference to FIG. 1, the number of imaging devices may vary based on the particular operating specifications of the particular imaging devices implemented and the proportions and/or exterior profiles of a particular vehicle and trailer. For example, large vehicle and trailer combinations may require additional imaging devices to capture image data corresponding to a larger operating environment. The imaging devices may also vary in viewing angle and range of a field of view corresponding to a particular vehicle and trailer combination.

The imaging devices C1, C3, C4, and C5 are disposed on the vehicle 10, each oriented to have a field of view directed towards a substantially different region of the operating environment 14. Imaging device C1 is disposed centrally on a rear portion 16 (e.g. a tailgate) of the vehicle 10 and may employ object detection to monitor the position of a target 18 disposed on the trailer 12 so that a hitch angle γ between the vehicle 10 and the trailer 12 can be determined. As used herein, the hitch angle γ is defined as the angle between a longitudinal centerline axis 20 of the vehicle 10 and the longitudinal centerline axis 22 of the trailer 12. In addition to imaging device C1, or alternatively thereto, imaging device C1' may be disposed centrally on a rear facing portion 24 of the vehicle 10 proximate a roof portion 26.

Imaging device C3 is disposed centrally on a front facing portion 28 of the vehicle 10 proximate a front grill portion 30. In addition to imaging device C3, or alternatively thereto, imaging device C3' may be disposed centrally on a front facing portion 32 of the vehicle proximate the roof portion 26. Imaging devices C1 (and/or C1') and C3 (and/or C3') are oriented such that the corresponding fields of view encompass substantially the entire operating environment 14 in the aft and fore directions relative to the vehicle 10.

Imaging devices C4 and C5 are disposed on a passenger side 34 and a driver side 36, respectively, and are configured to capture image data corresponding to the operating environment 14 to the sides of the vehicle 10. In some implementations, imaging device C4 is disposed proximate a passenger side mirror 38 and imaging device C5 is disposed proximate a driver side mirror 40. Imaging devices C4 and C5, in combination with imaging devices C1 and C3, are configured to capture image data corresponding to approximately the entire operating environment 14 surrounding the vehicle 10. However, when the vehicle is towing the trailer 12, the trailer 12 may occlude a large portion of a rearward facing field of view from the vehicle 10.

Imaging device C2 may be configure to operate in combination with the imaging devices C1 and C3-C5 to provide a combined field of view of the operating environment 14 surrounding the vehicle 10 and the trailer 12. Imaging device C2 may be disposed on a rear structure 42 of the trailer 12. Imaging device C2 may be located centrally in an upper portion 44 of the trailer 12 and have a rearward facing field of view relative to the trailer 12. Imaging device C2 can be variously located depending on trailer type and trailer geometry. In various implementations, the imaging device C2 may have a substantially rearward facing field of view configured to capture image data corresponding to the operating environment 14 that may be occluded from imaging devices C1 and C3-C5 by the trailer 12.

Figure 2:
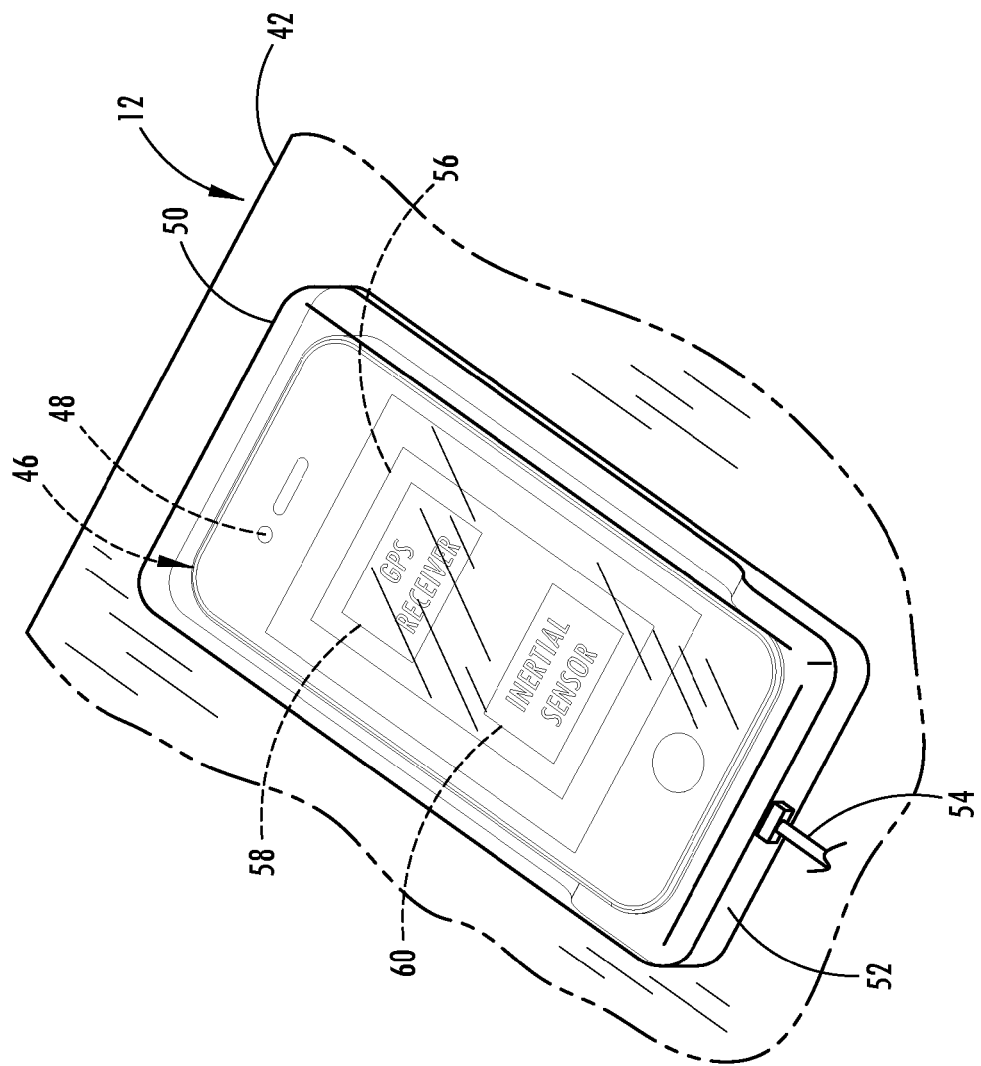
FIG. 2 illustrates an imaging device according to one embodiment.

Referring to FIG. 2, imaging device C2 is shown according to one implementation as a portable electronic device 46 with a built in camera 48 and corresponding image capture setting. Portable electronic device 46 may correspond to a smart device such as, but not limited to, a smart phone or a tablet. As shown, the portable electronic device 46 is provided in a housing 50 coupled to the rear structure 42 of the trailer 12. The housing 50 may be constructed from a transparent rigid material (e.g. plastic) to enable the portable electronic device 46 to accurately capture image data rearward of the trailer 12. The portable electronic device 46 can be supported within the housing 50 via a cradle 52 and/or other support mechanism and may be powered via a corresponding charging cord 54 that is electrically coupled to an electrical system of the trailer 12. The portable electronic device 46 may have an integrated navigational system 56 that includes a GPS receiver 58 for assisted GPS functionality and/or one or more integrated inertial sensors 60, which may include tri-axial gyroscopes, tri-axial accelerometers, tri-axial magnetometers, barometers, the like, or combination thereof. Image data from the camera 48 along with data from the GPS receiver 58 and/or the inertial sensors 60 may be communicated to a vehicle system via wired or wireless (e.g. Bluetooth®) connections. While one implementation of imaging device C2 has been described herein as being a portable electronic device 46, it should not be seen as limiting. Further, it should be appreciated that imaging devices C1 and C3-C5 may also be implemented as portable electronic devices, but are not limited thereto.

Figure 3:
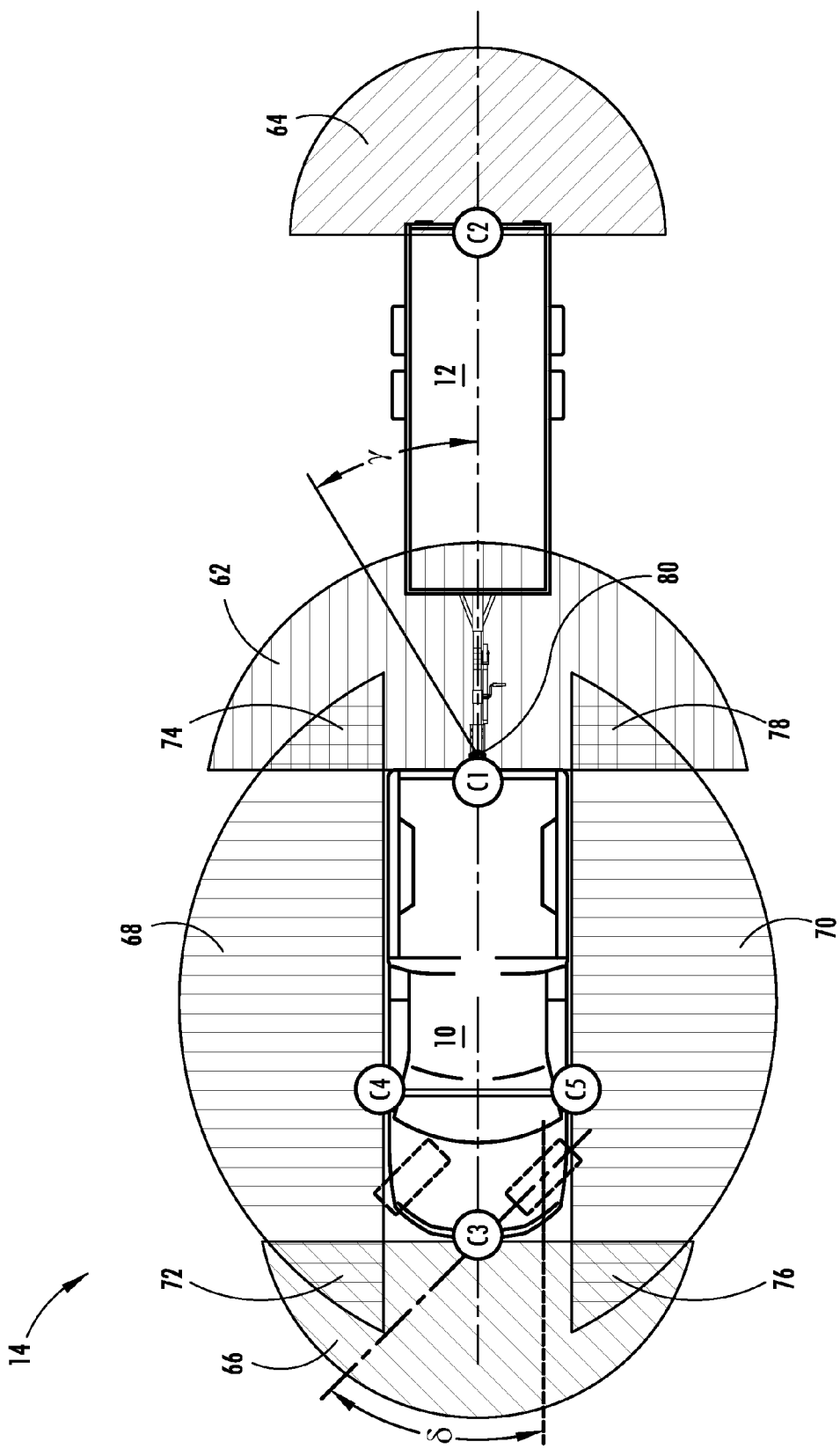
FIG. 3. is a top plan view of the vehicle connected to the trailer demonstrating a plurality of fields of view corresponding to the imaging devices.

Referring to FIG. 3, a top plan view of the vehicle 10 connected to the trailer 12 is shown demonstrating a plurality of fields of view of imaging devices C1-C5. In the illustrated embodiment, imaging device C1 is shown having field of view 62, imaging device C2 is shown having field of view 64, imaging device C3 is shown having field of view 66, imaging device C4 is shown having field of view 68, and imaging device C5 is shown having field of view 70. In this implementation, each of fields of view 62, 64, and 66 include a horizontal viewing angle of approximately 170 degrees or greater and each of corresponding imaging devices C1, C2, and C3 are configured to capture image data corresponding to the fore and aft directions relative to the vehicle 10 and the trailer 12. Imaging devices C4 and C5 are configured to capture image data corresponding to the operating area to each side of the vehicle 10 and the trailer 12 and have corresponding fields of view 68 and 70 that may include viewing angles of approximately 170 degrees or greater. As shown, field of view 68 may form an overlapping portion 72 with field of view 66 and an overlapping portion 74 with field of view 62. Similarly, field of view 70 may also form an overlapping portion 76 with field of view 66 and an overlapping portion 78 with field of view 62. While not shown, each of fields of view 62, 68, and 70 may further form overlapping portions with field of view 64. The overlapping portions may be combined in some implementations to form an expanded view or an aerial view of the vehicle 10 and the trailer 12. The imaging devices C1-C5 are configured to capture image data corresponding to objects and terrain in the surrounding operating environment 14 of the vehicle 10 and the trailer 12.

In the various implementations discussed herein, each of the fields of view 62-70 may be combined in any combination to form various expanded fields of view and corresponding viewing angles based on operating states and relative orientations of the vehicle 10 and the trailer 12. The operating states and relative orientations of the vehicle 10 and the trailer 12 may be determined from the heading of the vehicle 10, the velocity of the vehicle 10, the steering angle δ, and the hitch angle γ between the vehicle 10 and the trailer 12. In some implementations, the fields of view 62-70 may also be combined to form a composite aerial view or bird's eye view of the vehicle 10 and the trailer 12. Information related to the operating state and orientation of the vehicle 10 relative to the trailer 12 may also be utilized to generate a simulated aerial view of the vehicle 10 and the trailer 12 demonstrating the hitch angle γ about point 80.

The various views of the vehicle 10 and the trailer 12, as discussed herein, may be generated and displayed by a controller on the display 13 such that an operator of the vehicle 10 may view the information corresponding to the vehicle 10, the trailer 12, and the surrounding operating environment 14. The display 13 may be implemented in the vehicle 10 as a center stack monitor, rear view display mirror, gauge cluster monitor, a heads-up display, or any other device configured to present the image data processed from the imaging devices C1-C5. The image data from the imaging devices C1-C5 may be raw image data, lens corrected camera image data, composite image data, or any other form of image data captured by the imaging devices C1-C5 or any other form of imaging device.

Figure 4:
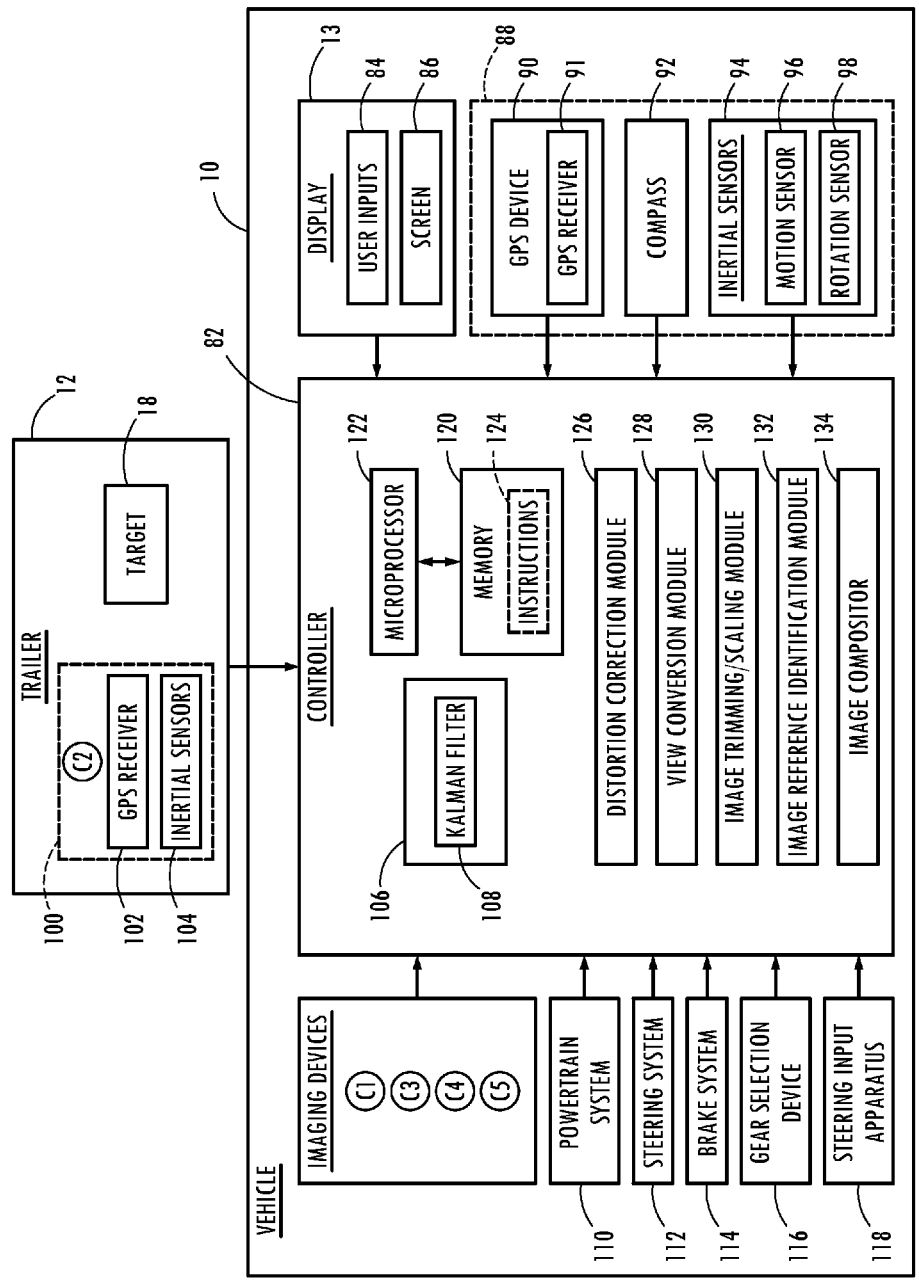
FIG. 4. is a block diagram of a controller in communication with the imaging devices and other equipment.

Referring to FIG. 4, a block diagram of a controller 82 is shown. The controller 82 may be combined or in communication with a trailer backup assist system. The controller 82 may receive and process image data from imaging devices C1-C5 to generate a variety of views for display on display 13. Display 13 may include a plurality of user inputs 84 to enable the controller 82 to receive selections from an operator of the vehicle 10. Display 13 may also include a screen 86 for showing one or more views, which may be selected by the operator and/or autonomously generated. According to one implementation, the screen 86 can be configured as a touch screen for registering one or more touch events. The screen 86 may employ resistive sensing, capacitive sensing, surface acoustic wave sensing, or any other sensing means capable of registering a single or multi-touch event for allowing an operator to input a variety of user commands related to trailer backup assist functionality.

The controller 82 may also be in communication with a first navigational system 88 that includes a GPS device 90, a compass 92, and one or more inertial sensors 94, each of which can be equipment already on-board the vehicle 10. The GPS device 90 can include GPS receiver 91 and is operable to determine a global position and location of the vehicle 10 and communicate the position and location to the controller 82. The compass 92 can be operable to determine the heading direction of the vehicle 10 relative to a geographic compass direction and communicate the heading direction to the controller 82. The inertial sensors 94 can be operable to determine the motion and rotation of the vehicle 10. They may include one or more motion sensors 96 (e.g. an accelerometer) and rotation sensors 98 (e.g. a gyroscope).

The controller 82 may further be in communication with a second navigational system 100, which can include a GPS receiver 102 and one or more inertial sensors 104. According to one implementation, GPS receiver 102 is integrated with imaging device C2. Optionally, inertial sensors 104 may also be integrated with imaging device C2, which can be configured as the portable electronic device 46 shown in FIG. 2. However, it should be appreciated that imaging device C2 can be implemented as a dedicated piece of equipment that is fixed to the trailer 12. Further, GPS receiver 102 and inertial sensors 104 can be provided elsewhere on the trailer 12 and may be incorporated with other equipment and/or structures on the trailer 12.

GPS receiver 102 may be operable to determine a global position and location of the trailer 12 and communicate the position and location to the controller 82. Inertial sensors 104 may be operable to determine the motion and rotation of the trailer 12 and can include any sensor configurations described herein. By providing a navigational system 100 on the trailer 12, the hitch angle γ between the vehicle 10 and the trailer 12 can be determined without the need for image based target recognition. This would also eliminate the need for an operator to attach a target (e.g. target 18) on the trailer 12 or perform vehicle/trailer measurements related to setting up an image based target detection system.

In one implementation, the controller 82 can calculate the hitch angle γ by comparing the vehicle position to the trailer position using vehicle position data received from GPS receiver 91 and trailer position data received from GPS receiver 102. In another implementation, the controller 82 may include a hitch angle detection module 106 configured to alternate between receiving vehicle position data outputted from GPS receiver 91 and trailer position data outputted from GPS receiver 102. The hitch angle detection module 106 can include a Kalman filter 108 for smoothing and extrapolating a vehicle position and a trailer position from the vehicle position data and the trailer position data and subsequently computing a hitch angle γ based on the extrapolated vehicle position and the extrapolated trailer position. In yet another implementation, the controller 82 may calculate the hitch angle γ based on data received from the inertial sensors 94 associated with the vehicle 10 and the inertial sensors 104 associated with the trailer 12. For instance, inertial sensors 94 and 104 can provide the controller 82 with data related to an instantaneous vehicle direction and an instantaneous trailer direction, respectively, which the controller 82 can use to calculate the hitch angle γ. In yet another implementation, the controller 82 may utilize position data for the vehicle 10 as a reference to compute differential position biases for the trailer 12 and vice versa. Doing so may result in more accurate relative position calculations between the vehicle 10 and the trailer 12, thereby resulting in more precise hitch angle γ calculations. It should be appreciated that each of the abovementioned implementations can be combined or performed separately.

As is further shown in FIG. 4, the controller 82 can be configured to communicate with one or more vehicle systems, shown as powertrain system 110, steering system 112, brake system 114, and a gear selection device (PRDNL) 116. Jointly, the powertrain system 110, steering system 112, brake system 114, and gear selection device 116 may cooperate to control the vehicle 10 and the trailer 12 during a backing procedure. According to one implementation, the controller 82 may send instructions to any one of the powertrain system 110, steering system 112, brake system 114, and gear selection device 116 based on input received from a steering input apparatus 118, which may include information defining a path of travel of the vehicle 10 and the trailer 12. The steering input apparatus 118 can be configured as a rotatable device (e.g. knob, steering wheel) that allows an operator of the vehicle 10 to steer the vehicle 10 during a backing maneuver.

The controller 82 may include a memory 120 coupled to one or more processors 122 for executing instructions 124 stored in the memory 120. The memory 120 and instructions 124 together define an example of a non-transient processor-readable medium. The controller 82 may further include a plurality of modules for combining the image data received from the imaging devices C1-C5 with satellite image data (e.g. from GPS device 90) to form various composite views of the operating environment 14 surrounding the vehicle 10 and the trailer 12. The plurality of modules may include a distortion correction module 126, a view conversion module 128, an image trimming/scaling module 130, an image reference identification module 132, and an image compositor 134.

To generate a composite view combining imaging data corresponding to two or more of the image devices C1-C5, the controller 82 may receive image data from the imaging devices C1-C5 and correct any distortion in the image data with the distortion correction module 126. Distortion in the image data may be the result of lens distortion, viewpoint correction, or any other form of distortion common in imaging devices. The view conversion module 128 may then convert a viewpoint of the image data. A viewpoint correction may correspond to altering the orientation of a perspective of the image data corresponding to a field of view of an imaging device. For example, the image data may be adjusted from a side view to an aerial view. The image data from each of the two or more imaging devices may then be trimmed and scaled by the image trimming/scaling module 130 and combined in the image compositor 134. The composite image data output by the compositor 134 may form an expanded field of view, an aerial view, or any combination of the image data received from the imaging devices C1-C5.

In some implementations, the relative location of the image data received from the two or more imaging devices may further be aligned by the image reference identification module 132. The image reference identification module 132 may be operable to detect and identify objects in the image data received from each of the imaging devices C1-C5 and utilize objects in different fields of view to align and accurately combine the image data. The image compositor 134 may further be able to identify occluded and/or missing image data and request satellite image data or other feature data from the GPS device 90 to further supplement and enhance the composite image data. The resulting enhanced composite image data may then be output to the screen 86 for display to the operator of the vehicle 10.

Figure 5:
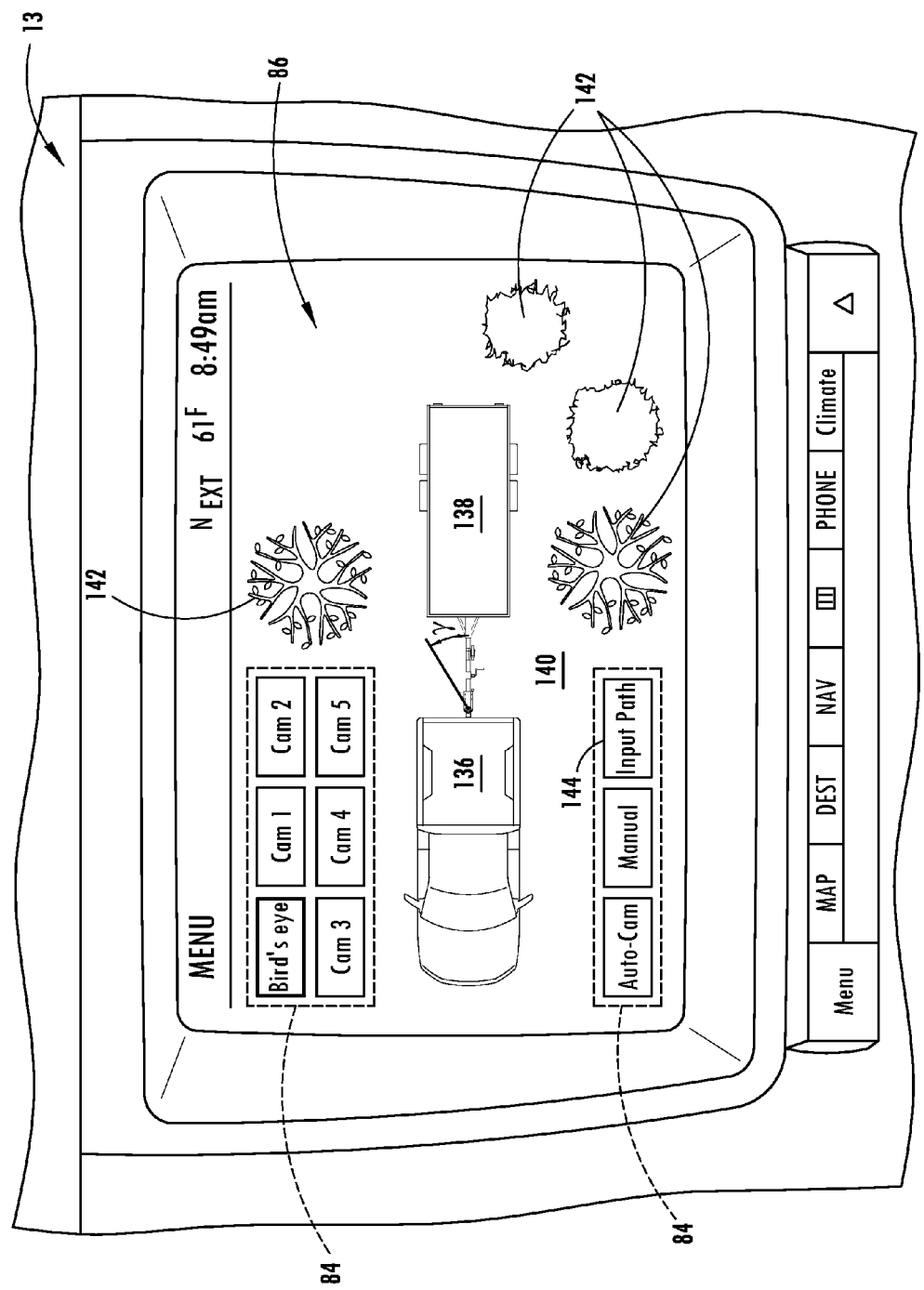
FIG. 5. is a diagram of an aerial view of the vehicle and the trailer displayed on a display located within the vehicle.

Referring to FIG. 5, an aerial view of the vehicle 10 and the trailer 12 is displayed on the screen 86 of display 13. A vehicle model 136 of the vehicle 10 and a trailer model 138 of the trailer 12 may be incorporated into the aerial view by the controller 82 as sample image data and/or rendered graphics. The sample image data may include stock images of the vehicle 10 and a library of trailer images that may be incorporated in the aerial view to demonstrate the proportions and position of the vehicle 10 relative to the trailer 12. In some implementations, the vehicle operator may input the dimensions of the trailer 12 from the vehicle operator via the user inputs 84 of display 13. The controller 82 may also be operable to estimate the dimensions of the trailer 12 based on known relationships of the positions of each of the imaging devices C1-C5. For example, the controller 82 may be operable to detect the trailer 12 in the image data with the image reference identification module 132. Based on the known relationships of the positions of the imaging devices C1-C5 and the corresponding fields of view 62-70, the controller 82 may be operable to determine the proportions, approximate dimensions, and shape of the trailer 12 to generate the trailer model 138.

The controller 82 may further utilize the hitch angle γ to process and compare image data of the trailer 12 in different positions relative to the vehicle 10 to gain additional image data to determine the proportions, approximate dimensions, and shape of the trailer 12. The hitch angle γ may further be utilized by the controller 82 to display the trailer model 138 relative to the vehicle model 136 at the corresponding hitch angle γ. By demonstrating the vehicle model 136 and the trailer model 138, the controller 82 may provide useful information to the operator of the vehicle 10. In some implementations, a graphic outline simulating the trailer 12 may also be included in the image data displayed on the screen 86 for a reference to the operator of the vehicle 10 to demonstrate the position of the trailer model 138 relative to the vehicle model 136 and an operating environment model 140. Based on the determined proportions, approximate dimensions, and shape of the trailer 12, the controller 82 may automatically select a trailer graphic or a stock image of a trailer model 138 from a library of trailer images or graphics via memory 120.

A plurality of environmental features 142 may also be displayed on the screen 86 by the controller 82. The environmental features 142 may be incorporated in the image data displayed on the screen 86 to demonstrate a location of the environmental features 142 relative to the vehicle model 136 and the trailer model 138. The locations of the environmental features 142 may be extrapolated from the composite image data captured by the imaging devices C1-C5 by the image reference identification module 132 of the controller 82. Each of the environmental features 142 may be identified based on one or more feature identification algorithms configured to identify various natural and man-made features that may obstruct the path of the vehicle 10 and the trailer 12. Additionally or alternatively, sensors and/or radar may be used for detecting environmental features that may be in the path of the vehicle 10 and the trailer 12.

The environmental features 142 may be identified and incorporated in the aerial view based on image data, satellite image data, and any other data corresponding to the position and heading of the vehicle 10. Based on the position and heading of the vehicle 10, the environmental features 142 may be added to the composite image data and located on the screen 86 relative to the vehicle model 136 and the trailer model 138 by utilizing global positions of each of the environmental features 142. The location of the environmental features 142 may be determined by the controller 82 from the GPS device 90 and the compass 92. By enhancing the aerial view with satellite image data, the controller 82 may provide additional information that may be used in addition to the information identified from the imaging devices C1-C5. In some implementations, satellite image data may further be utilized by the controller 82 to provide information corresponding to a region that may be occluded from the fields of view 62-70 of the imaging devices C1-C5.

The screen 86 of display 13 may be configured as a touchscreen of any type such as a resistive type, capacitive type, surface acoustic type, infrared type, and optical type. The plurality of user inputs 84 may be implemented as soft keys and provide options for the operator of the vehicle 10 to alter a view displayed by the controller 82. The soft keys may allow the operator of the vehicle 10 to view the operating environment 140 and select a view corresponding to each of the imaging devices C1-C5, a combination of the imaging devices C1-C5, or the composite aerial view. The soft keys may further provide an option for a manual mode to manually control the view displayed on the screen 86 or an automatic mode to automatically control the view displayed on the screen 86.

Figure 6:
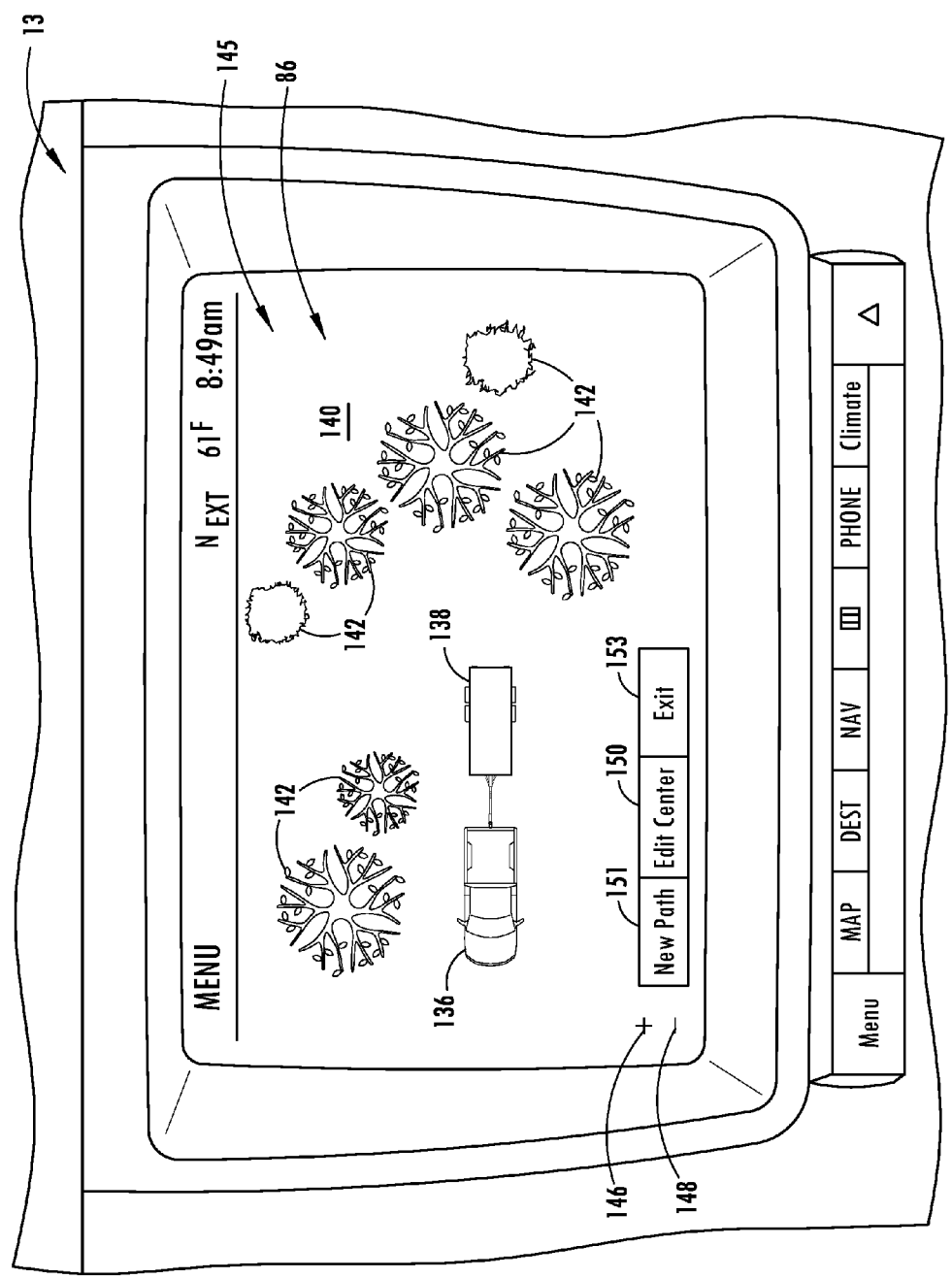
FIG. 6. illustrates a path input screen displayed on the display.

While the composite aerial view is selected, an operator of the vehicle 10 may touch soft key 144 to enter a path input mode. When the path input mode is activated, the controller 82 may prompt the display 13 to display a path input screen 145 as shown in FIG. 6. The path input screen 145 can correspond to a "zoomed out" aerial view of the aerial view shown in FIG. 5. Additionally, the zoomed out aerial view may show other environmental features 142 that were not shown in the previous aerial view. By providing a zoom feature, the operator of the vehicle 10 is afforded a greater view of the operating environment. However, it is contemplated that the operator may decrease the amount of zoom should the operator desire a magnified view. The amount of zoom may be adjusted automatically or manually via zoom out key 146 and zoom in key 148. It is also contemplated that the vehicle model 136 and the trailer model 138 may be initially located at the center of the screen 86 by default. An operator may later adjust the screen center by touching the edit center soft key 150 and then dragging the aerial view in a desired direction. Once the aerial view is located in the desired position, the operator may touch the edit center soft key 150 to lock the new aerial view in place. The controller 82 may fit the new aerial view to the screen 86 and analyze image data and/or satellite image data to display any new environmental features 142 arising therefrom.

According to one implementation, the screen 86 is configured to register a touch event that inputs an intended backing path for the vehicle 10 and the trailer 12. Before the intended backing path can be inputted, certain prerequisite conditions may be required. For instance, it may be required for the gear selection device 116 of the vehicle 10 to be in either a park or a reverse position and that the vehicle 10 and the trailer 12 be aligned with one another. To input an intended backing path, the operator of the vehicle 10 may touch the new path soft key 151 and then trace the intended backing path on the screen 86. At any point, the operator may touch the exit soft key 153 to exit the path input mode.

Figure 7:
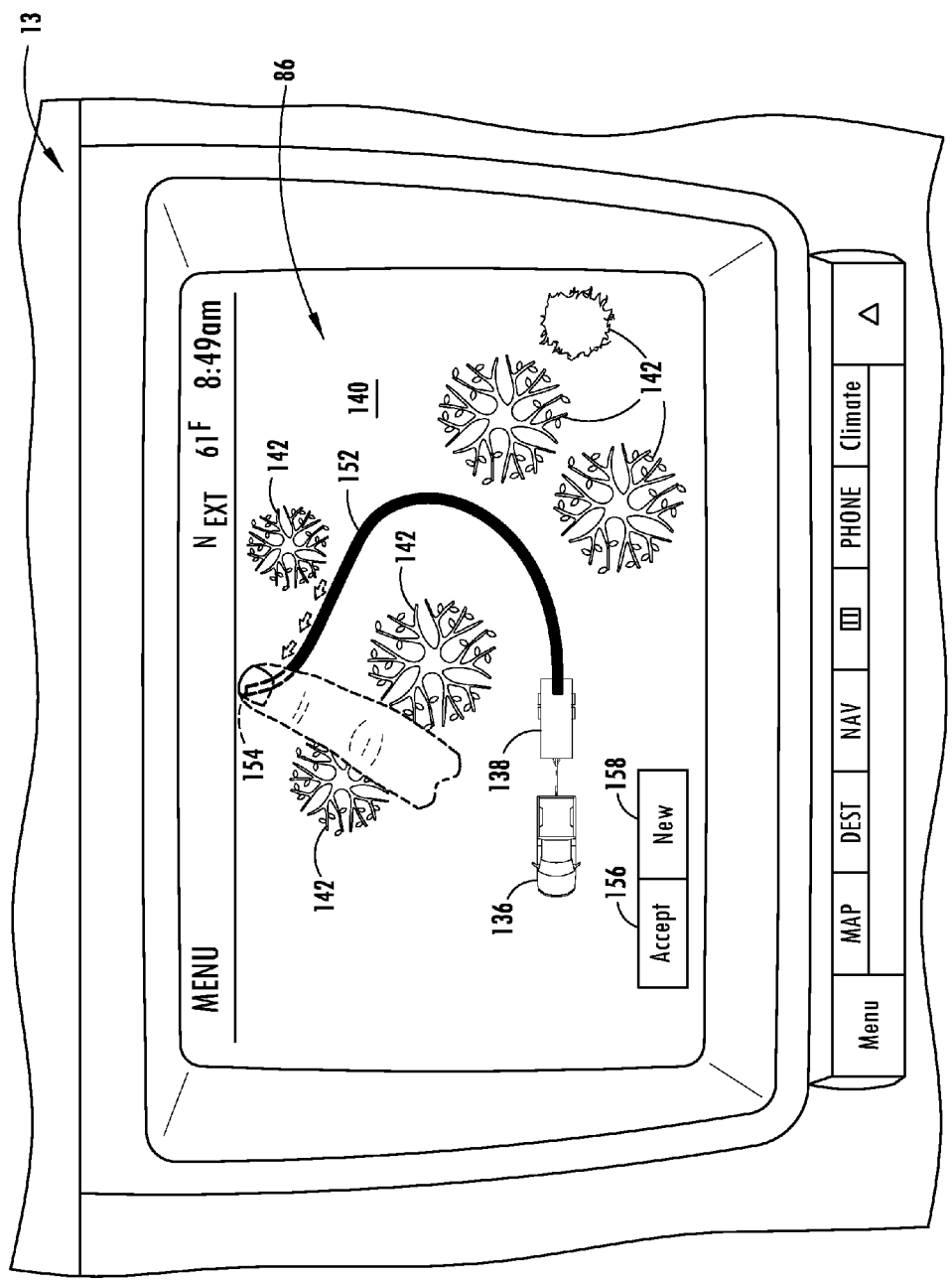
FIG. 7. illustrates a touch event being registered on the path input screen to input an intended backing path.

An intended backing path 152 is exemplarily shown in FIG. 7. The intended backing path 152 may be traced (e.g. using a finger) from the rear of the trailer model 138 and terminates at a final position 154 selected by the operator. Once traced, the intended backing path 152 is represented as an overlay on the screen 86. The intended backing path 152 may be curved, straight, or a combination thereof. Preferably, the intended backing path 152 is traced to avoid obstacles displayed on the screen 86, which may include environmental features 142 and any objects that would impede the vehicle 10 and trailer 12 from being backed along the intended backing path 152. The obstructions can be natural and/or man-made and may be detected using one or a combination of imaging devices C1-C5 in addition to satellite image data. It is also contemplated that sensors and/or radar may be employed for object detection.

When the intended backing path 152 has been traced, the operator may touch soft key 156 to accept the intended backing path 152 or otherwise touch soft key 158 to trace a new one. While the intended backing path 152 is being traced or afterwards, the controller 82 may determine if any unacceptable path conditions are present. An unacceptable path condition may arise if any traced portions of the intended backing path 152 would result in a hitch angle γ between the vehicle 10 and the trailer 12 exceeding a maximum hitch angle γ, thereby creating a possible jackknife condition. Another unacceptable path condition may arise if one or more obstacles block the intended backing path 152. If one or more unacceptable path conditions arise, the controller 82 may generate a warning to the operator indicating that the intended backing path 152 requires revision or that a new intended backing path needs to be inputted. The warning may be of any type intended to stimulate the senses of an operator and may include warnings that are visual, auditory, tactile, or a combination thereof.

Figure 8:
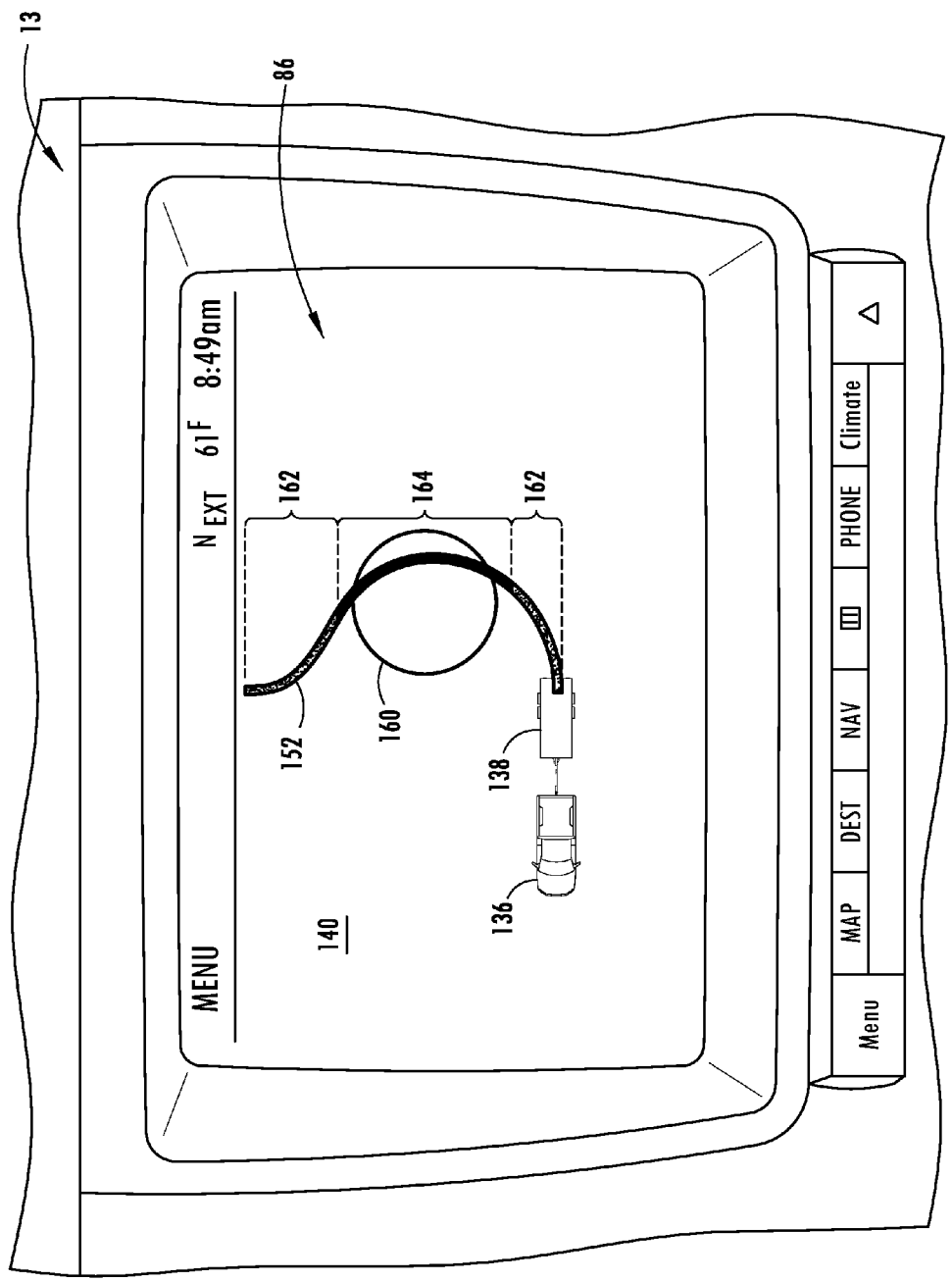
FIG. 8. illustrates an intended backing path crossing through an obstacle.

In FIG. 8, an intended backing path 152 is exemplarily shown crossing through an obstacle 160. As shown, the intended backing path 152 has various traced portions corresponding to unobstructed portions 162 and an obstructed portion 164. To alert the operator of the unacceptable path condition, the controller 82 may display the unobstructed portions 162 of the intended backing path 152 in a first color (e.g. green) and display the obstructed portion 164 in a second color (e.g. red) that is visually distinguishable from the first color. In response to the unacceptable path condition, another touch event may be performed to modify the intended backing path 152.

Figure 9:
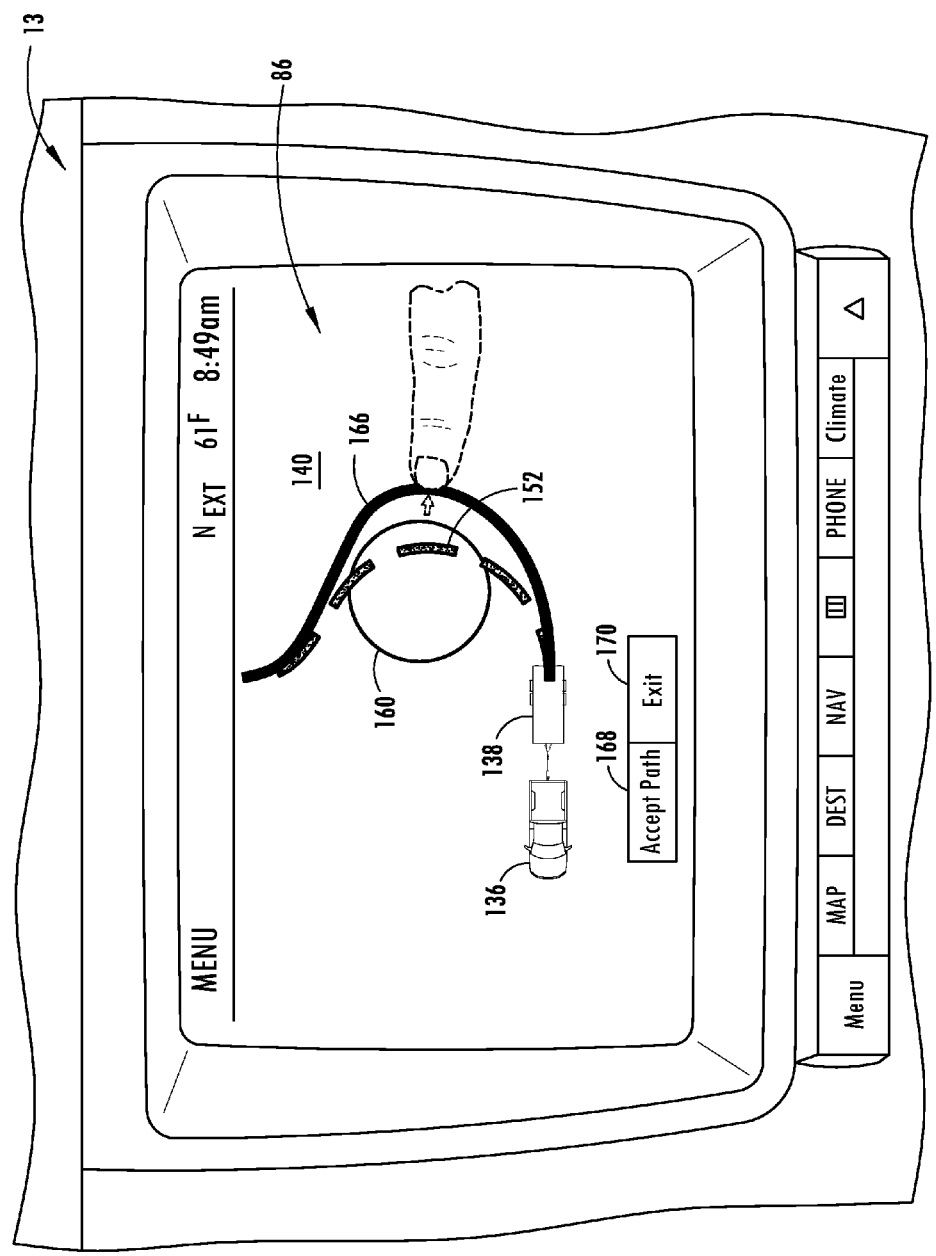
FIG. 9. illustrates a touch event that modifies the intended backing path.
Figure 10:
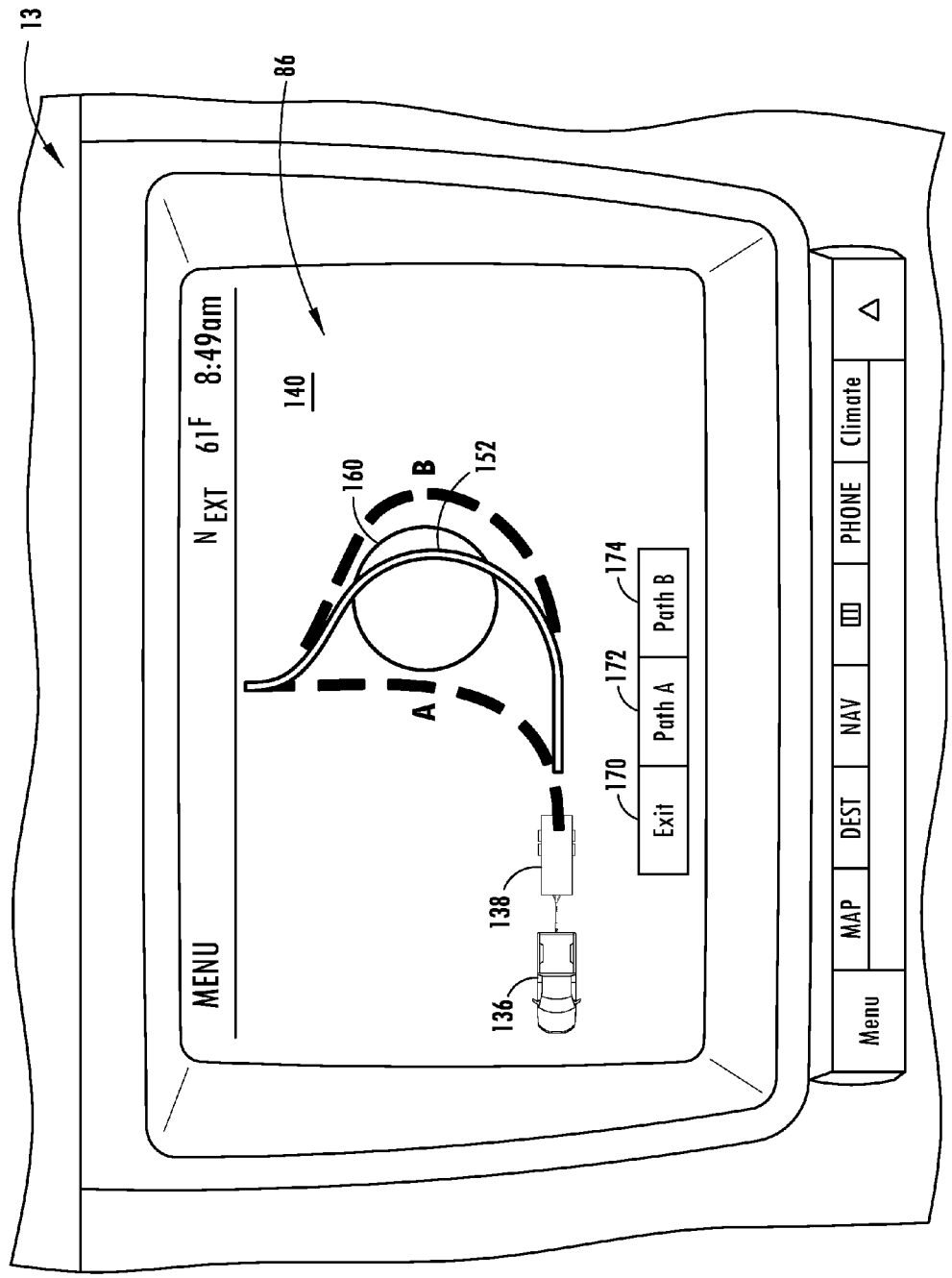
FIG. 10. illustrates a path selection screen displaying suggested backing paths.

According to one implementation shown in FIG. 9, the operator may manipulate the obstructed portion 164 of the intended backing path 152 by dragging the obstructed portion 164 away from the obstacle 160. It is contemplated that the operator may drag any area of the obstructed portion 164 in any direction. While this occurs, the controller 82 may automatically adjust the curvature of the modified intended backing path 166 as needed to ensure allowable hitch angles γ and/or avoid any other potential obstacles. If no unacceptable backing conditions arise from the modified intended backing path 166, soft key 168 may become available to allow the operator to accept the modified intended backing path 166. Otherwise, the operator may touch soft key 170 to exit back to the path input screen 145. Additionally or alternatively, the controller 82 may automatically generate one or more possible backing paths A, B, as shown in FIG. 10, and the operator may be given the option of selecting one of the suggested backing paths A, B via a corresponding soft key 172, 174.

Once a backing path has been entered via soft key 168, the controller 82 may extrapolate GPS coordinates for all points along the backing path. The controller 82 may work in conjunction with the GPS device 90 and send instructions to the powertrain system 110, steering system 112, and/or brake system 114 to back the vehicle 10 and the trailer 12 along the inputted backing path. Depending on which systems 110, 112, 114 are employed, the backing maneuver may be completely autonomous or require some actions on the part of the operator of the vehicle 10. While the vehicle 10 and the trailer 12 are backing along the backing path, the operator may adjust the path curvature using the steering input apparatus 118 and/or performing another touch event on the screen 86 (e.g. dragging a traced portion of the backing path). The final resulting backing path may be saved to the GPS device 90 or other location, either manually or automatically. Additionally, the GPS coordinates along with the orientation of the vehicle 10 and trailer 12 may also be saved to the GPS device 90 and/or other location. In this manner, an operator performing repetitive backing maneuvers can simply retrieve and order a saved backing path to be performed instead of having to manually input the backing path each time. Similarly, when an operator pulls of a parking spot, the corresponding pull out path may also be saved accordingly and may be subsequently or concurrently displayed as an overlay on the screen 86. It should be appreciated that an operator may input a pull out path via one or more touch events in a similar way to inputting a backing path, as described herein. Furthermore, saved backing and/or pull out paths may be offered as suggested paths when applicable.

Figure 11:
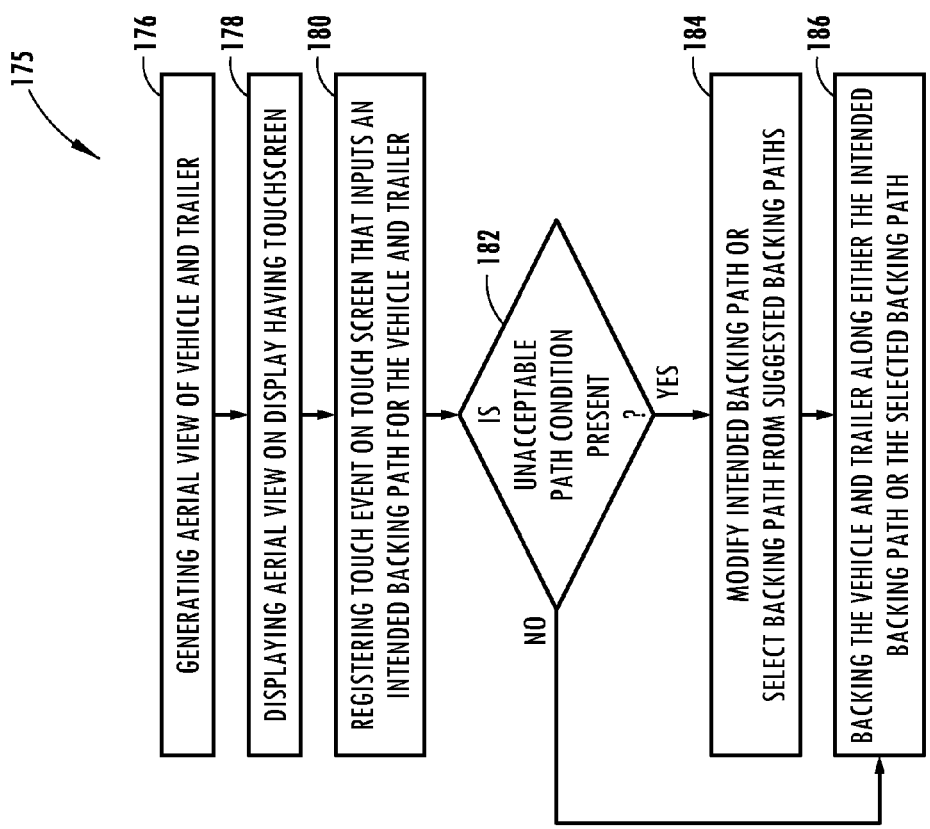
FIG. 11. is a flow diagram for a method of inputting a backing path.

Referring now to FIG. 11, a method 175 for inputting a backing path is shown. The method may be implemented using the controller 82 and other equipment described herein and shown in FIGS. 4-10. More specifically, the method can be embodied as instructions 124 stored in memory 120 and executable by processor 122. The method 175 may begin at step 176, which includes generating an aerial view of a vehicle 10 and a trailer 12 based on at least one of image data and satellite image data. Step 178 includes displaying the aerial view on a display 13 having a touch screen 86. Step 180 includes registering a touch event on the touch screen 86 that inputs an intended backing path for the vehicle 10 and the trailer 12. Step 182 includes determining whether an unacceptable path condition is present. If an unacceptable path condition exits, step 184 includes modifying the intended backing path to overcome the unacceptable path condition or selecting a backing path from one or more suggested backing paths to overcome the unacceptable path condition. Step 186 includes backing the vehicle 10 and the trailer 12 along either the intended backing path or the backing path selected in step 184.

The systems and methods described herein may offer improvements to the functionality of a trailer backup assist system. Though the systems and methods were described and illustrated herein as being implemented on a specific vehicle and trailer, it should be appreciated that the systems and methods described herein may be utilized with any vehicle and trailer combination in accordance with the disclosure.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A path input system comprising:
a controller for generating an aerial view of a vehicle; and
a display having a touch screen for displaying the aerial view and registering a touch event thereon that traces an intended backing path for the vehicle and the trailer, wherein unobstructed portions and obstructed portions of the intended backing path are displayed in different colors, and wherein the touch event further comprises dragging an obstructed portion of the intended backing path to modify a path curvature of the intended backing path.

2. The system of claim 1, wherein the controller is configured to determine whether an unacceptable path condition is present and generate a warning indicating the presence of the unacceptable path condition.

3. The system of claim 2, wherein the unacceptable path condition comprises one of a traced portion of the intended backing path resulting in a hitch angle between the vehicle and the trailer exceeding a maximum hitch angle and one or more obstacles blocking a traced portion of the intended backing path.

4. The system of claim 1, wherein the controller is configured to automatically adjust a path curvature of the intended backing path to avoid an unacceptable path condition.

5. The system of claim 1, wherein the controller is configured to generate one or more possible backing paths that are displayed alongside the intended backing path.

6. A path input system comprising:
a controller for generating an aerial view of a vehicle and a trailer; and
a display for displaying the aerial view on a touch screen configured to register a first touch event thereon that traces an intended backing path for the vehicle and the trailer and a second touch event thereon that modifies the intended backing path by dragging an obstructed portion of the intended backing path.

7. The system of claim 6, wherein the controller is configured to determine whether an unacceptable path condition is present and generate a warning indicating the presence of the unacceptable path condition.

8. The system of claim 7, wherein the unacceptable path condition comprises one of a traced portion of the intended backing path resulting in a hitch angle between the vehicle and the trailer exceeding a maximum hitch angle and one or more obstacles blocking a traced portion of the intended backing path.

9. The system of claim 6, wherein the controller is configured to automatically adjust a path curvature of the intended backing path to avoid an unacceptable path condition.

10. The system of claim 6, wherein the controller is configured to generate one or more possible backing paths that are displayed alongside the intended backing path.

11. The system of claim 6, wherein the controller is configured to save the intended backing path for later use.

12. The system of claim 6, wherein the obstructed portion of the intended backing path is displayed in a color that is visually distinguishable from a color used to display an unobstructed portion of the intended backing path.

13. A path input system comprising:
- a controller for generating an aerial view of a vehicle and a trailer; and
- a display for displaying the aerial view on a touch screen configured to register a touch event thereon that traces an intended backing path for the vehicle and the trailer, wherein the controller is configured to determine whether an unacceptable path condition is present and generate a warning indicating the presence of the unacceptable path condition, and wherein the touch screen is further configured to register a touch event thereon that drags an obstructed portion of the intended backing path to modify a path curvature of the intended backing path.

14. The system of claim 13, wherein the obstructed portion of the intended backing path is displayed in a color that is visually distinguishable from a color used to display an unobstructed portion of the intended backing path.

15. The system of claim 13, wherein the unacceptable path condition comprises one of a traced portion of the intended backing path resulting in a hitch angle between the vehicle and the trailer exceeding a maximum hitch angle and one or more obstacles blocking a traced portion of the intended backing path.

16. The system of claim 13, wherein the controller is configured to automatically adjust a path curvature of the intended backing path to avoid an unacceptable path condition.

17. The system of claim 13, wherein the controller is configured to generate one or more possible backing paths that are displayed alongside the intended backing path.

18. The system of claim 13, wherein the controller is configured to save the intended backing path for later use.

* * * * *